(12) United States Patent
Bhat et al.

(10) Patent No.: US 10,154,197 B2
(45) Date of Patent: *Dec. 11, 2018

(54) IMAGE CAPTURE DEVICE HAVING LIGHT FIELD IMAGE CAPTURE MODE, 2D IMAGE CAPTURE MODE, AND INTERMEDIATE CAPTURE MODE

(71) Applicant: Google LLC, Mountain View, CA (US)

(72) Inventors: Jerome Chandra Bhat, Palo Alto, CA (US); Brandon Elliott Merle Clarke, Sunnyvale, CA (US); Graham Butler Myhre, San Francisco, CA (US); Ravi Kiran Nalla, San Jose, CA (US); Steven David Oliver, San Jose, CA (US); Tony Yip Pang Poon, Fremont, CA (US); William D. Houck, II, Fremont, CA (US); Colvin Pitts, Snohomish, WA (US); Yi-Ren Ng, Palo Alto, CA (US); Kurt Akeley, Saratoga, CA (US)

(73) Assignee: GOOGLE LLC, Mountain View, CA (US)

( * ) Notice: Subject to any disclaimer, the term of this patent is extended or adjusted under 35 U.S.C. 154(b) by 43 days.

This patent is subject to a terminal disclaimer.

(21) Appl. No.: 15/203,643

(22) Filed: Jul. 6, 2016

(65) Prior Publication Data

US 2016/0316144 A1    Oct. 27, 2016

Related U.S. Application Data

(63) Continuation-in-part of application No. 14/716,055, filed on May 19, 2015, now Pat. No. 9,411,122, (Continued)

(51) Int. Cl.
*H04N 7/18* (2006.01)
*G02B 7/02* (2006.01)
(Continued)

(52) U.S. Cl.
CPC .......... *H04N 5/23245* (2013.01); *G02B 3/12* (2013.01); *G02B 7/023* (2013.01); *G02B 7/08* (2013.01);
(Continued)

(58) Field of Classification Search
CPC ...... G02B 27/0075; G02B 3/12; G02B 7/023; G02B 7/08; G02F 1/1337; H04N 13/0232;
(Continued)

(56) References Cited

U.S. PATENT DOCUMENTS 4,647,808 A    3/1987  Shibuya
6,545,816 B1 *  4/2003  Kroupenkine ....... G02B 26/005
                                                    359/299
(Continued)

OTHER PUBLICATIONS

Zhu et al, Focus-tunable microlens arrays fabricated on spherical surfaces (Year: 2011).*
(Continued)

*Primary Examiner* — Shan E Elahi

(57) ABSTRACT

An image capture device, such as a camera, has multiple modes including a light field image capture mode, a conventional 2D image capture mode, and at least one intermediate image capture mode. By changing position and/or properties of the microlens array (MLA) in front of the image sensor, changes in 2D spatial resolution and angular resolution can be attained. In at least one embodiment, such changes can be performed in a continuous manner, allowing a continuum of intermediate modes to be attained.

28 Claims, 31 Drawing Sheets

Related U.S. Application Data which is a continuation of application No. 14/480,240, filed on Sep. 8, 2014, now Pat. No. 9,077,901.

(60) Provisional application No. 61/876,377, filed on Sep. 11, 2013.

(51) Int. Cl.

| | | |
|---|---|---|
| *H04N 5/232* | (2006.01) | |
| *H04N 5/225* | (2006.01) | |
| *G02F 1/1337* | (2006.01) | |
| *H04N 13/289* | (2018.01) | |
| *G02B 27/00* | (2006.01) | |
| *G02B 7/08* | (2006.01) | |
| *G02B 3/12* | (2006.01) | |
| *H04N 13/232* | (2018.01) | |
| *H04N 13/296* | (2018.01) | |

(52) U.S. Cl.
CPC ....... *G02B 27/0075* (2013.01); *G02F 1/1337* (2013.01); *H04N 5/2254* (2013.01); *H04N 5/2257* (2013.01); *H04N 5/23212* (2013.01); *H04N 5/23229* (2013.01); *H04N 13/232* (2018.05); *H04N 13/289* (2018.05); *H04N 13/296* (2018.05)

(58) Field of Classification Search
CPC ............. H04N 13/0235; H04N 13/026; H04N 13/0289; H04N 13/0296; H04N 5/2254; H04N 5/23212; H04N 5/23222; H04N 5/23229; H04N 5/23245
USPC .......................................................... 348/47
See application file for complete search history.

(56) References Cited

U.S. PATENT DOCUMENTS

| | | | | |
|---|---|---|---|---|
| 6,665,127 B2* | 12/2003 | Bao | ........................ | G02B 3/12 359/665 |
| 6,815,016 B2* | 11/2004 | Kyu | ........................ | C09K 19/02 349/183 |
| 6,912,090 B2* | 6/2005 | Kornblit | ............ | G02B 27/0068 359/619 |
| 6,936,196 B2* | 8/2005 | Chandross | ....... | B29D 11/00365 264/1.36 |
| 7,460,309 B2* | 12/2008 | Venema | ............... | G02B 3/0012 359/626 |
| 7,623,303 B2* | 11/2009 | Fang | .................. | G02B 26/0866 359/665 |
| 8,026,976 B2* | 9/2011 | Tamura | ................ | H04N 5/2354 348/370 |
| 8,248,515 B2 | 8/2012 | Ng et al. | | |
| 8,593,564 B2 | 11/2013 | Border et al. | | |
| 8,872,085 B2* | 10/2014 | Gruhlke | ............... | G02B 6/0051 250/208.1 |
| 8,872,943 B2* | 10/2014 | Naka | ................... | H04N 5/23296 348/220.1 |
| 9,077,901 B2* | 7/2015 | Bhat | ..................... | H04N 13/232 |
| 9,210,329 B2* | 12/2015 | Naka | ............... | H04N 5/23296 |
| 9,411,122 B2* | 8/2016 | Bhat | ................ | H04N 13/0235 |
| 9,565,367 B2* | 2/2017 | Naka | ............... | H04N 5/23296 |
| 2003/0202256 A1* | 10/2003 | Bao | .......................... | G02B 3/12 359/665 |
| 2003/0227100 A1* | 12/2003 | Chandross | ....... | B29D 11/00365 264/1.36 |
| 2004/0105048 A1* | 6/2004 | Kyu | ........................ | C09K 19/02 349/95 |
| 2004/0184155 A1* | 9/2004 | Kornblit | ............ | G02B 27/0068 359/619 |
| 2005/0117195 A1 | 6/2005 | Glebov et al. | | |
| 2007/0253487 A1* | 11/2007 | Kim | ..................... | H04N 19/105 375/240.16 |
| 2008/0074536 A1* | 3/2008 | Tamura | ................ | H04N 5/2351 348/371 |
| 2008/0165270 A1 | 7/2008 | Watanabe et al. | | |
| 2009/0103170 A1* | 4/2009 | Fang | .................. | G02B 26/0866 359/298 |
| 2010/0141802 A1 | 6/2010 | Knight et al. | | |
| 2011/0090494 A1* | 4/2011 | Krupenkine | ............. | G02B 3/14 356/243.1 |
| 2012/0033095 A1* | 2/2012 | Naka | ................... | H04N 5/23296 348/220.1 |
| 2013/0234935 A1 | 9/2013 | Griffith | | |
| 2015/0070474 A1* | 3/2015 | Bhat | .................. | H04N 13/0235 348/49 |
| 2015/0234187 A1* | 8/2015 | Lee | .................... | G02B 27/0172 345/8 |
| 2015/0247986 A1* | 9/2015 | Bhat | .................. | H04N 13/0235 348/360 |
| 2016/0088232 A1* | 3/2016 | Naka | .................. | H04N 5/23296 348/240.1 |

OTHER PUBLICATIONS

Aldalali et al, A micro camera utilizing a microlens array for multiple viewpoint imaging (Year: 2011).*
Notice of Allowance dated Feb. 5, 2015 for U.S. Appl. No. 14/480,240, 15 pages.
Notice of Allowance dated May 20, 2015 for U.S. Appl. No. 14/480,240, 12 pages.
Notice of Allowance dated Apr. 20, 2016 for U.S. Appl. No. 14/716,055, 10 pages.
Non-Final Office Action dated Apr. 19, 2017 for U.S. Appl. No. 15/054,030, 10 pgs.

* cited by examiner

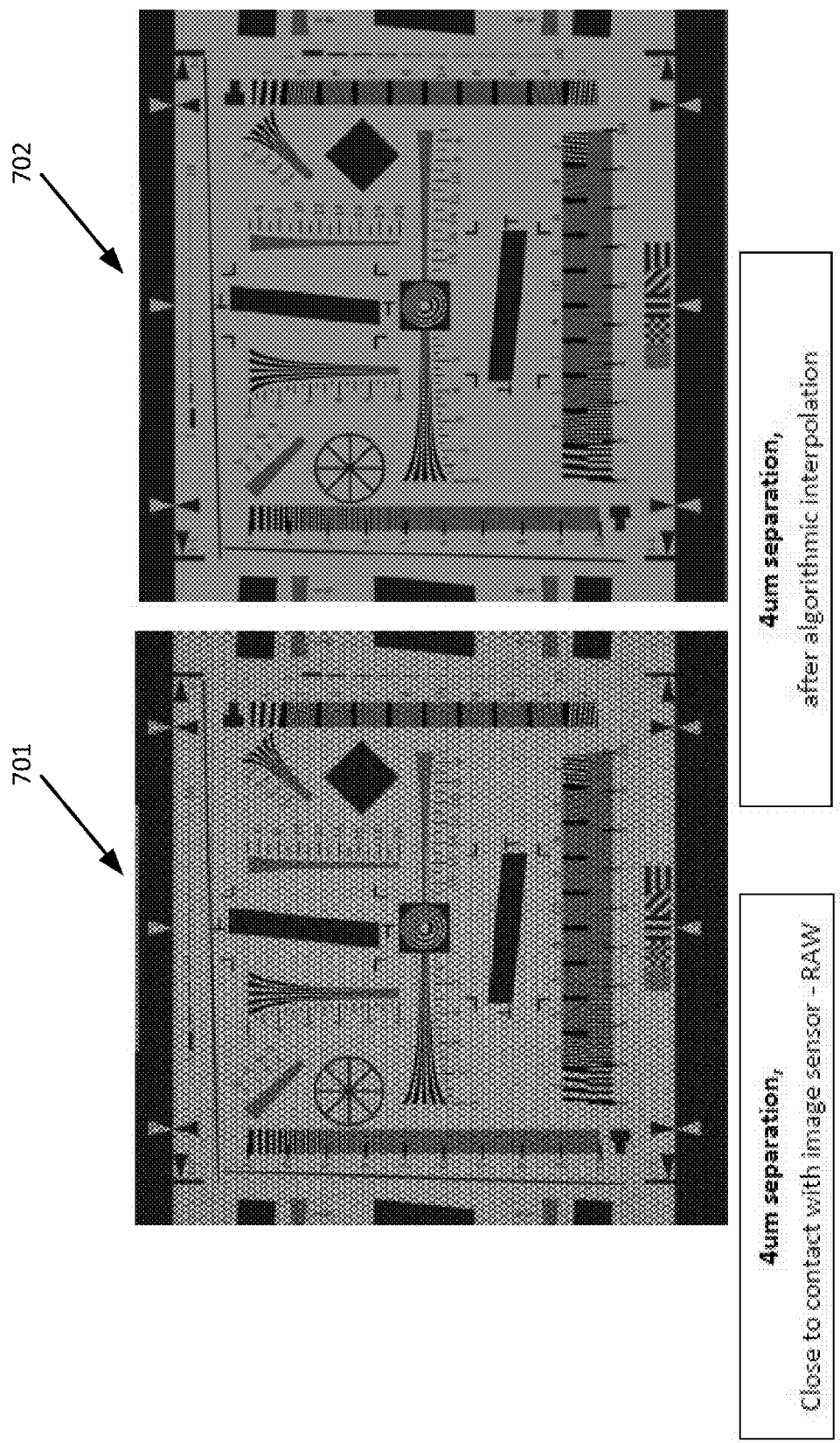

IMAGE CAPTURE DEVICE HAVING LIGHT FIELD IMAGE CAPTURE MODE, 2D IMAGE CAPTURE MODE, AND INTERMEDIATE CAPTURE MODE

CROSS-REFERENCE TO RELATED APPLICATION

The present application claims priority as a continuation-in-part of U.S. Utility application Ser. No. 14/716,055 for "Light Field Image Capture Device Having 2D Image Capture Mode", filed on May 19, 2015, which claimed priority from U.S. Utility application Ser. No. 14/480,240 for "Light Field Image Capture Device Having 2D Image Capture Mode", filed on Sep. 8, 2014 and issued on Jul. 7, 2015 as U.S. Pat. No. 9,077,901.

U.S. Utility application Ser. No. 14/480,240 claimed the benefit of U.S. Provisional Application Ser. No. 61/876,377 for "Moving, Enabling, and Disabling Microlens Array in Light Field Capture Device", filed on Sep. 11, 2013.

All of the above-mentioned applications are incorporated herein by reference.

TECHNICAL FIELD

The present description relates to light field imaging devices and applications, and more particularly to mechanisms for facilitating light field imaging, conventional 2D imaging, and an intermediate imaging mode within the same camera system.

BACKGROUND

Light field capture devices (also referred to as "light field image data acquisition devices" or "light field cameras") are defined herein as any devices that are capable of capturing light field data, optionally processing light field data, optionally accepting and acting upon user input, and/or optionally displaying or otherwise outputting images and/or other types of data.

Light field capture devices such as plenoptic cameras may capture light field data using any suitable method for doing so. One example of such a method includes, without limitation, using a microlens array (MLA) disposed between a main imaging lens and an image sensor (e.g., a CCD or CMOS sensor) as described in Ng et al., Light field photography with a hand-held plenoptic capture device, Technical Report CSTR 2005-02, Stanford Computer Science.

In most MLA-based plenoptic cameras, the MLA is disposed within the optical path, in front of and close to (or in contact with) the image sensor. The main lens collects light from the scene and projects this onto the MLA and image sensor combination (also known as the light field sensor). Each lens of the MLA images a portion of the exit pupil image from the main lens onto the image sensor as a series of disk images. Each lens of the MLA records a slightly different portion of the exit pupil of main lens. This difference in the projected MLA disk images can be used to compute the angular direction of the light rays at each pixel location. Optically this system is equivalent to a sub-aperture array based plenoptic camera.

In an MLA-based plenoptic camera, the MLA is usually attached to the image sensor surface at a fixed distance that is optimized to achieve the best spatial and angular resolution for the application of the light field camera. The MLA can be designed with different microlens pitches and focal distances to enable higher spatial resolution or to enable higher angular resolution.

However, existing MLA-based plenoptic cameras are generally unable to provide multiple modes wherein the same camera is able to function in a light field image capture mode, a conventional 2D image capture mode, and at least one intermediate image capture mode.

SUMMARY

Various embodiments provide mechanisms to enable an image capture device, such as a camera, to have multiple modes including a light field image capture mode, a conventional 2D image capture mode, and at least one intermediate image capture mode. By changing position and/or properties of the microlens array (MLA) in front of the image sensor, changes in 2D spatial resolution and angular resolution can be attained. In at least one embodiment, such changes can be performed in a continuous manner, allowing a continuum of intermediate modes to be attained.

Details of the relationship between MLA position and angular/spatial resolution are discussed, for example, in U.S. Pat. No. 8,648,958, titled "Variable Imaging Arrangements and Methods Therefor", filed Jul. 5, 2012 and issued on Feb. 11, 2014, the disclosure of which is incorporated herein by reference. By allowing the position and/or properties of the MLA on the image sensor to be changed, an increase in 2D imaging resolution of the optical system can be attained with a trade-off in light field or 3D imaging capability.

In conventional plenoptic or light field cameras, the gap separation between the MLA and image sensor is fixed to achieve optimal spatial resolution and angular resolution to achieve refocusing and/or 3D imaging of the light field. Various techniques provide enhancements to such cameras to enable them to perform both 3D light field imaging and conventional high-resolution 2D imaging, as well as intermediate forms of imaging, depending on the selected mode. In particular, various embodiments include an active system that enables the microlenses to be optically or effectively turned on or turned off, allowing the camera to selectively operate as a 2D imaging camera or a 3D light field camera. In some embodiments, intermediate modes are available; for example, configuration of the microlenses can be performed on a continuous basis, allowing the device to gradually move from the 2D mode to the light field mode, and further allowing for image capture to take place which the device is in an intermediate state between these two modes.

Further details and variations are described herein.

BRIEF DESCRIPTION OF THE DRAWINGS

The accompanying drawings illustrate several embodiments. Together with the description, they serve to explain the principles and operational mechanics of the embodiments. One skilled in the art will recognize that the particular embodiments illustrated in the drawings are merely exemplary, and are not intended to limit scope.

FIGS. 7-1 and 7-2 depict exemplary simulation results of moving the MLA to various positions in front of the image sensor plane, according to one embodiment.

In FIG. 16, an electric field has been applied between the two ITO layers to turn the liquid crystal off, so as to eliminate the index gradient.

In FIG. 18, no voltage is applied, so that the electro-optic material has a uniform refractive index and does not act like a lens.

DETAILED DESCRIPTION

For ease of nomenclature, the term "camera" is used herein to refer to an image capture device or other data acquisition device. Such a data acquisition device can be any device or system for acquiring, recording, measuring, estimating, determining and/or computing data representative of a scene, including but not limited to two-dimensional image data, three-dimensional image data, and/or light field data. Such a data acquisition device may include optics, sensors, and image processing electronics for acquiring data representative of a scene, using techniques that are well known in the art, are disclosed herein, or could be conceived by a person of skill in the art with the aid of the present disclosure.

One skilled in the art will recognize that many types of data acquisition devices can be used, and that the system and method described herein are not limited to cameras. Thus, the use of the term "camera" herein is intended to be illustrative and exemplary, but should not be considered to limit scope. Specifically, any use of such term herein should be considered to refer to any suitable device for acquiring image data.

It is advantageous in some applications (for example mobile camera systems) to have the same camera system operate as a conventional high-resolution 2D camera and also as a 3D light field camera. By optically or effectively disabling the MLA, trade-offs can be made between higher 2D spatial resolution and 3D light field imaging capabilities. Various embodiments include an active system that enables the microlenses to be optically or effectively turned on or turned off, allowing the camera to selectively operate as a 2D imaging camera or a 3D light field camera. Additional embodiments all for intermediate modes between the 2D image capture mode and the light field image capture mode. In at least one embodiment, a continuum of such intermediate modes can be provided.

Accordingly, in the following description, several techniques and methods for moving, enabling, and disabling a microlens array in a light field capture device are described. One skilled in the art will recognize that these various techniques and methods can be performed singly and/or in any suitable combination with one another.

Architecture

Figure 1:
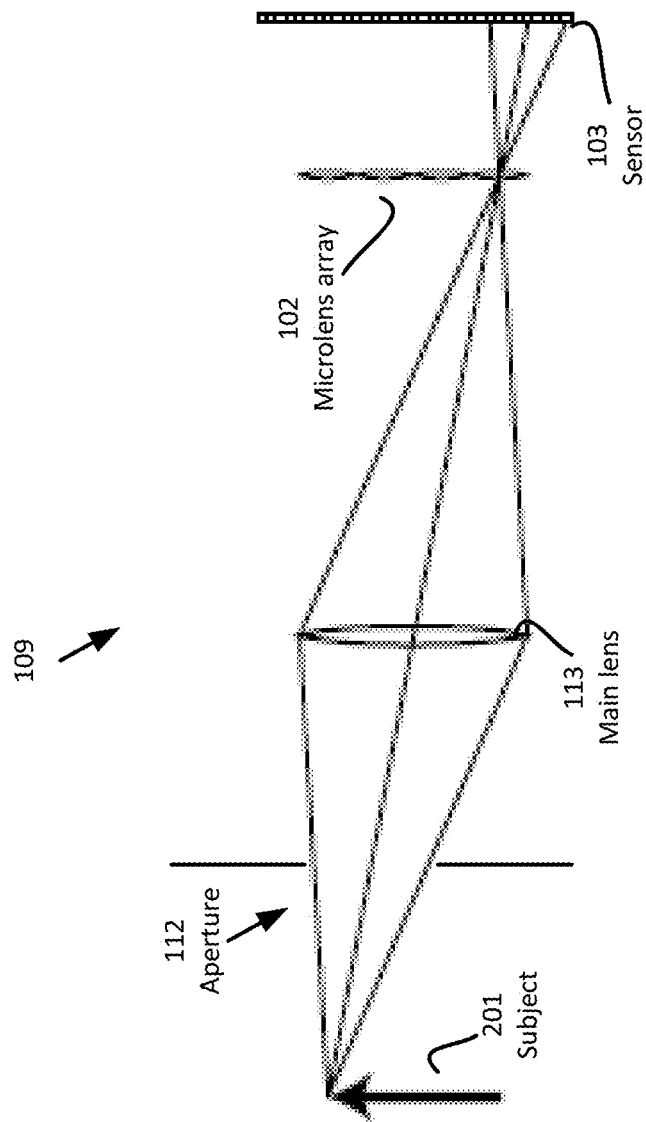
FIG. 1 depicts an example of an architecture for a light field image data acquisition device, such as an MLA-based plenoptic camera.

Referring to FIG. 1, there is shown an example of an architecture for a light field image data acquisition device, such as an MLA-based plenoptic camera 100, according to one embodiment. FIG. 1 is not shown to scale. FIG. 1 shows, in conceptual form, the relationship between aperture 112, main lens 113, microlens array 102, and sensor 103, as such components interact to capture light field data for subject 201. As can be seen from FIG. 1, microlens array 102 is placed within the optical path of camera 100, between main lens 113 and sensor 103.

Figure 2:
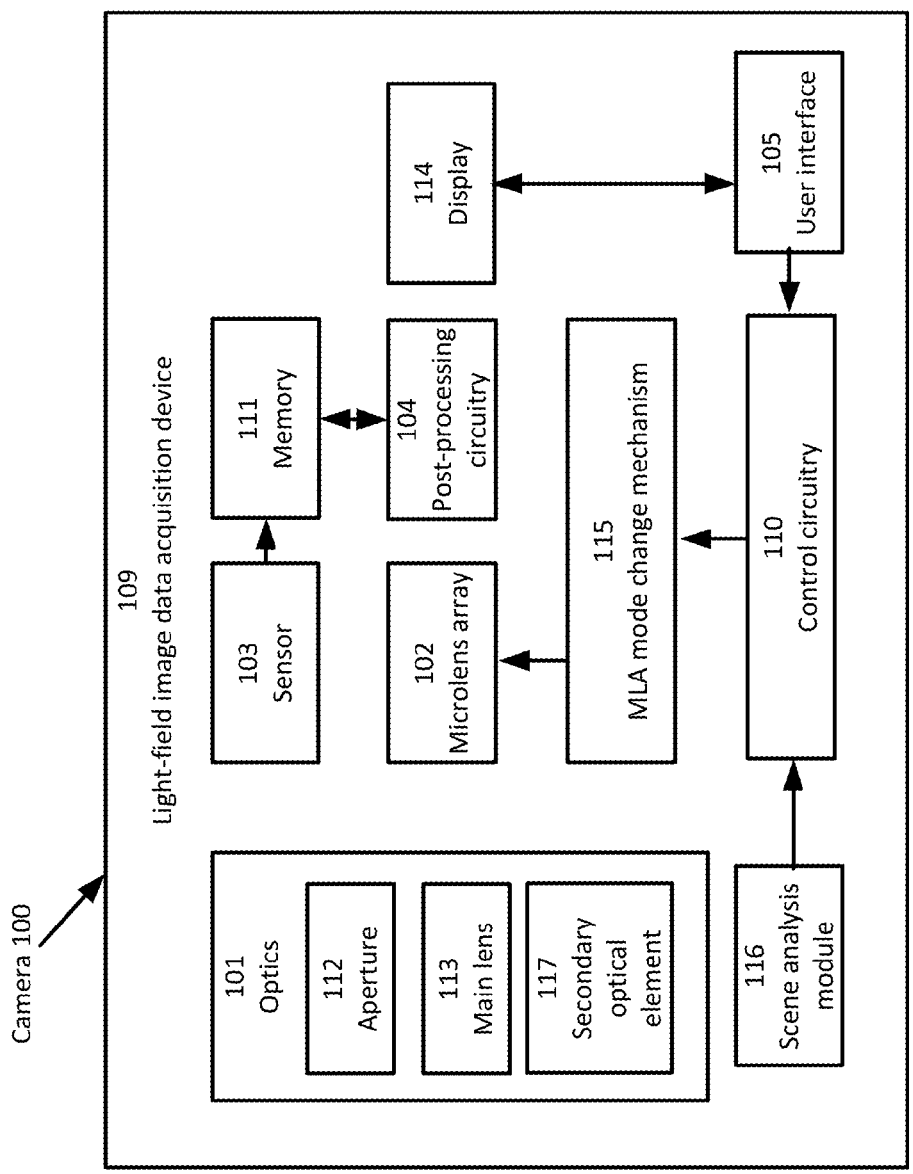
FIG. 2 depicts an example of a functional architecture for a light field image data acquisition device, such as a camera, according to one embodiment.

Referring now also to FIG. 2, there is shown a block diagram depicting a functional architecture for a light field image data acquisition device, such as a camera 100, according to one embodiment. Camera 100 may be constructed using the architecture depicted in FIG. 1. One skilled in the art will recognize that the particular configurations shown in FIGS. 1 and 2 are merely exemplary, and that other architectures are possible. One skilled in the art will further recognize that several of the components shown in the configurations of FIGS. 1 and 2 are optional, and may be omitted or reconfigured. Other components as known in the art may additionally or alternatively be added.

In at least one embodiment, camera 100 may be a light field camera that includes light field image data acquisition device 109 having optics 101, image sensor or sensor 103 (including a plurality of individual sensors for capturing pixels), and microlens array 102. Optics 101 may include, for example, aperture 112 for allowing a selectable amount of light into camera 100, and main lens 113 for focusing light toward microlens array 102. In at least one embodiment, microlens array 102 may be disposed and/or incorporated in the optical path of camera 100 (between main lens 113 and sensor 103) so as to facilitate acquisition, capture, sampling of, recording, and/or obtaining light field image data via sensor 103. MLA 102 may be constructed using any suitable material, including for example a deformable material or a non-deformable material. One example of a deformable material is an optically transparent polymer. Examples of non-deformable materials include optically transparent polymer and optically transparent glass. One skilled in the art will recognize that any other suitable material can be used.

In at least one embodiment, optics 101 may also optionally include a secondary optical element 117. This can be any element or component that transmits, blocks, or refracts light moving through it. Examples of secondary optical element 117 include, without limitation, a lens, an LCD, a flat or curved piece of polymer or glass, or the like. Element 117 can be affixed to or attached to any other component(s), such as for example MLA 102, sensor 103, main lens 113, or the like, or it can be separate from such components.

In at least one embodiment, element 117 is in the optical path of light entering camera 100. In other embodiments, element 117 can be omitted.

Sensor 103 can be of any suitable type, such as for example a CMOS sensor.

In at least one embodiment, camera 100 may also include a user interface 105, which may include any suitable input device for allowing a user to provide input for controlling the operation of camera 100 for capturing, acquiring, storing, and/or processing image data. In at least one embodiment, the techniques described herein provide mechanisms for display of depth information in connection with user interface 105. Such depth information can be displayed, for example, on display device 114 which may be a display screen on camera 100.

In at least one embodiment, camera 100 may include memory 111 for storing image data, such as output by sensor 103. The memory 111 can include external and/or internal memory. In at least one embodiment, memory 111 can be provided at a separate device and/or location from camera 100. For example, camera 100 may store raw light field image data, as output by sensor 103, and/or a representation thereof, such as a compressed image data file. In addition, memory 111 can also store data representing the characteristics, parameters, and/or configurations of camera 100 and/or its components.

In at least one embodiment, captured image data is provided to post-processing circuitry 104. Such processing circuitry 104 may be disposed in or integrated into light field image data acquisition device 109, as shown in FIG. 2, or it may be in a separate post-processing device (not shown) external to light field image data acquisition device 109. Such separate component may be local or remote with respect to light field image data acquisition device 109. The post-processing circuitry 104 may include a processor of any known configuration, including microprocessors, ASICS, and the like.

In at least one embodiment, camera 100 includes MLA mode change mechanism 115, which selectively enables or disables MLA 102 so as to provide at least two modes wherein the camera alternatively functions as either a light field camera or a conventional 2D camera, as described in more detail below. Mechanism 115 can be coupled to any components within camera 100, including for example MLA 102 and/or secondary optical element 117 (if included). In at least one embodiment, as described herein, mechanism 115 can provide any number of intermediate modes between the 2D image capture mode and the light field image capture mode. In at least one embodiment, mechanism 115 can change mode gradually, so as to provide a continuum of image capture modes between the 2D image capture mode and the light field image capture mode.

In at least one embodiment, camera 100 may also include control circuitry 110 for facilitating acquisition, sampling, recording, and/or obtaining light field image data. For example, control circuitry 110 may manage and/or control (automatically or in response to user input) the acquisition timing, rate of acquisition, sampling, capturing, recording, and/or obtaining of light field image data. In at least one embodiment, control circuitry 110 also sends control signals to MLA mode change mechanism 115 to cause mechanism 115 to switch modes, for example under the control of user interface 105.

In at least one embodiment, camera 100 may optionally include scene analysis module 116 for analyzing a scene to automatically determine whether a 2D imaging mode, or a light field imaging mode, or some intermediate mode, should be used.

Figure 3:
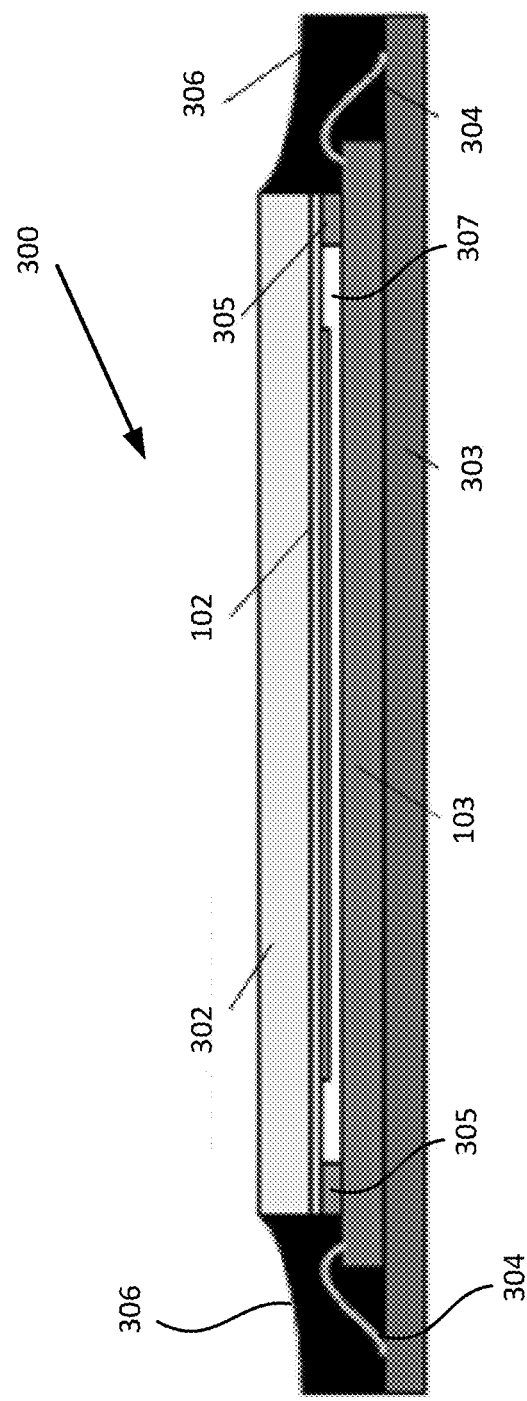
FIG. 3 depicts an example of construction of a light field sensor assembly with a fixed spacer defining the gap separation between the MLA layer and the image sensor.

Referring now to FIG. 3, there is shown an example of construction of a light field sensor assembly 300 with a fixed spacer 305 defining the gap separation 307 between the MLA layer 102 and image sensor 103. Sensor 103 is affixed to printed circuit board 303, which may contain the hardware circuitry for processing light field data and/or storing or relaying such data to other components. Wire bonds 304 are an example of a mechanism for holding sensor 103 in place with respect to printed circuit board 303. Encapsulation 306 forms a casing around the assembly to protect and stabilize it. MLA layer 102 may be formed from substrate 302, which may be made of glass or any other suitable material. In this example, spacer 305 is fixed and may be constructed of any suitable material. Spacer 305 can be affixed to sensor 103 and/or to encapsulation 306 and/or to substrate 302.

Figure 4:
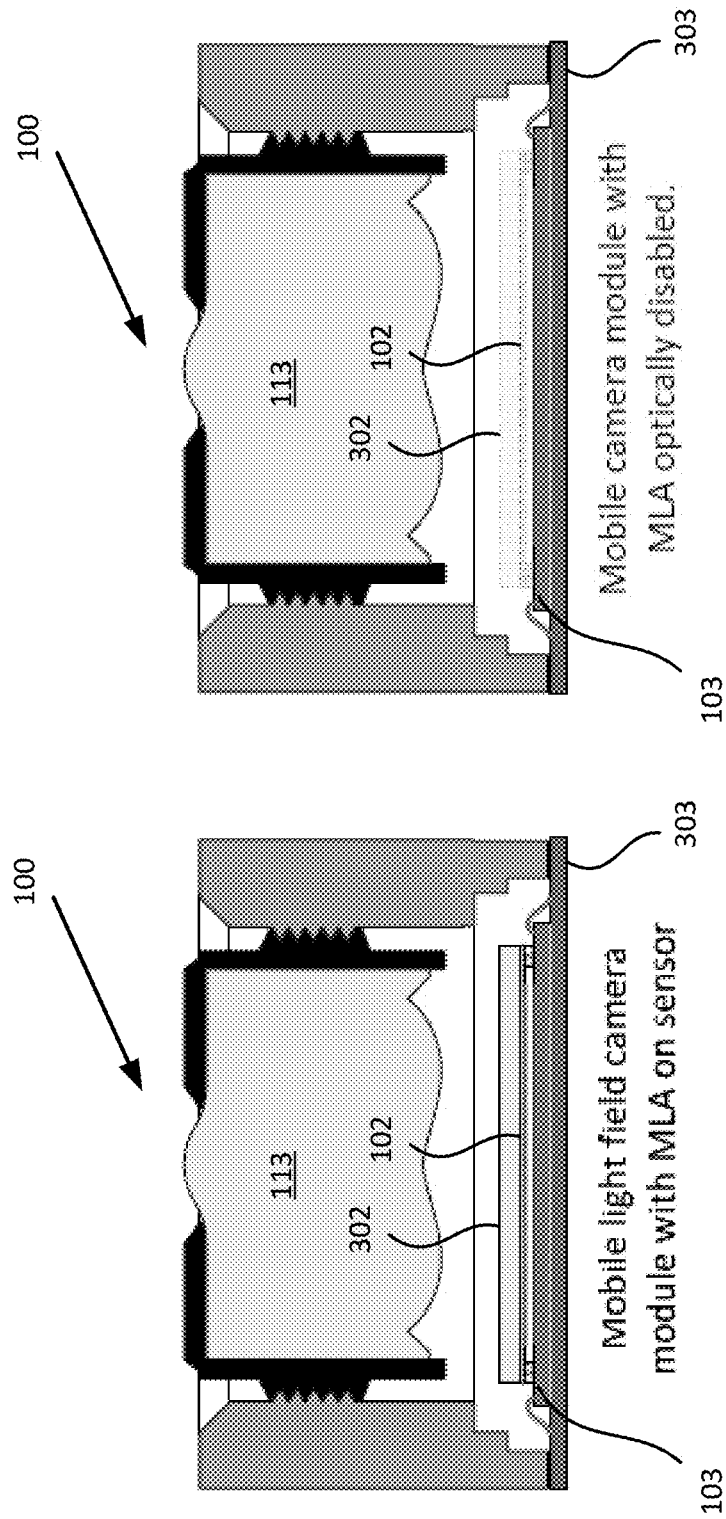
FIG. 4 depicts an architecture for a light field camera suitable for mobile applications, wherein the MLA can be optically disabled to enable higher resolution 2D image capture, according to one embodiment.

Referring now to FIG. 4, there is shown an example of an architecture for a light field camera 100 suitable for mobile applications (as well as other applications), wherein MLA 102 can be optically disabled (or partially disabled) to enable higher resolution 2D image capture.

As depicted above, MLA 102 is positioned in front of sensor 103 and can be constructed from substrate 302. On the left-hand side of FIG. 4, MLA 102 is enabled, so that camera 100 functions as a light field image acquisition device. On the right-hand side of FIG. 4, MLA 102 has been optically disabled, so that camera 100 functions as a conventional 2D camera. By allowing the selective enabling and disabling of MLA 102, so as to make it optically effective or optically invisible, camera 100 provides functionality for switching between a light field acquisition mode and a conventional image acquisition mode. As described herein, in at least one embodiment, intermediate modes are also available. Accordingly, in at least one embodiment, camera 100 includes MLA mode change mechanism 115, so as to provide such functionality.

Figure 20:
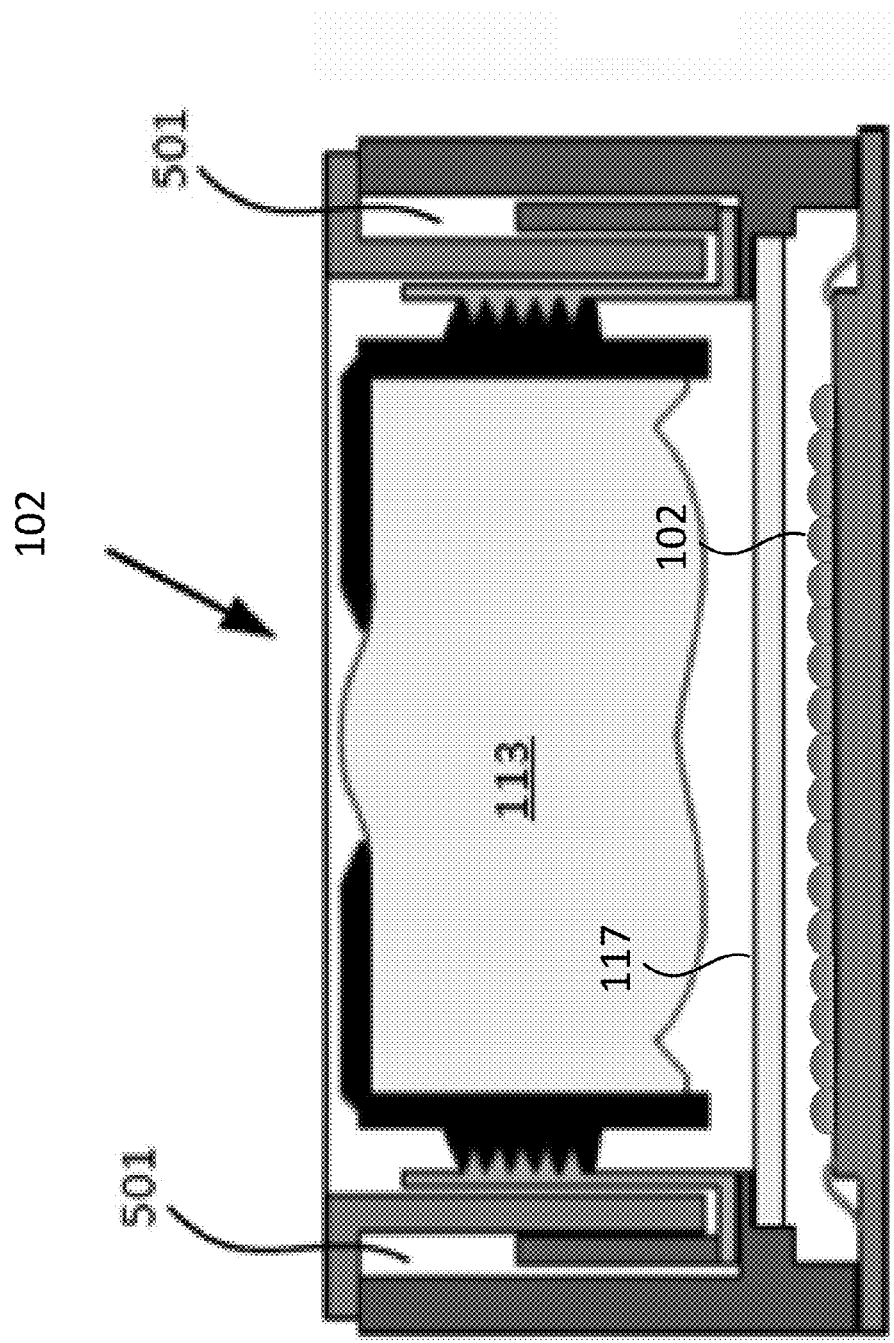
FIG. 20 depicts an example of a camera wherein a secondary optical element is positioned in the optical path, according to one embodiment.

Referring now to FIG. 20, there is shown an alternative embodiment for a camera 100, wherein a secondary optical element 117 is positioned in the optical path between main lens 113 and MLA 102.

Figure 19:
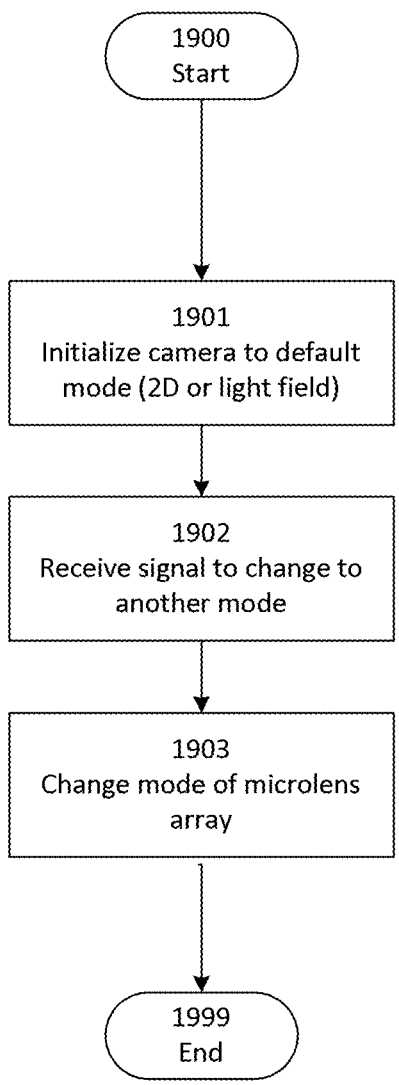
FIG. 19 is a flowchart depicting a method for switching between a 2D imaging mode and a 3D light field capture mode, according to one embodiment.

Referring now to FIG. 19, there is shown a flowchart depicting a method for switching between a 2D imaging mode and a light field capture mode, according to one embodiment. Camera 100 is initialized 1901 to a default mode, either a 2D imaging mode or a light field capture mode. This default mode can be preset, or it can be the same mode that was in effect the last time camera 100 was used, or it can be chosen by some other means. As described in more detail below, any of a number of techniques can be used to configure camera 100 to be in the default mode. MLA mode change mechanism 115 receives 1902 a signal to change to another mode. Such signal can be triggered, for example, by a user command entered via user interface 105, or automatically by detecting that another mode is more suitable to the particular image subject at hand, or by some other means. In response to such a signal, MLA mode change mechanism 115 causes MLA 102 to change modes 1903, either by enabling MLA 102, disabling it, or placing it in an intermediate mode where it is partially enabled. More particularly, if 2D imaging mode is desired, MLA 102 is optically or effectively disabled; if light field capture mode is desired, MLA 102 is optically or effectively enabled; if some intermediate mode is desired, MLA 102 is partially enabled. Again, any suitable technique, including but not limited to those described below, can be used for optically or effectively enabling, disabling, or partially enabling MLA 102. If, in step 1903, it is determined that MLA 102 is already in the desired state, then no action need be taken.

Any of a number of different mechanisms can be used for optically or effectively enabling, disabling, or partially enabling MLA 102 in step 1903; accordingly, mechanism 115 can take any of a number of different forms. Examples of techniques for changing the mode of MLA 102 according to various embodiments include:

- Moving MLA 102 from a light field imaging position to a position close to image sensor 103.
- Moving MLA 102 to a position where it is no longer in the optical path.
- Introducing an index-matching medium between image sensor 103 and MLA 102 to make the lenses of MLA 102 lose their refractive focusing power.
- Moving MLA 102 from the light field imaging position to a position where it is in contact with an index-matching material on the surface of image sensor 103.
- Using a known material medium with changeable refractive index properties to disable MLA 102. In at least one embodiment, a liquid crystal type medium can be placed between MLA 102 and image sensor 103. A known electric field can be applied to such medium to change the index of refraction of the medium and thus effectively change MLA's 102 overall refractive power.

In these various embodiments, mechanism 115 can take whatever form is suitable for performing the above-described operations so as to enable and disable MLA 102.

In at least one embodiment, camera 100 can provide active feedback regarding the relative position of MLA 102 in any of the above-described embodiments.

The enablement, disablement, and/or partial enablement of MLA 102 in any of the above-described embodiments can be algorithmically determined based on collected parameters of the light field. In at least one embodiment, scene analysis module 116 is included, which examines the depth information of each pixel and applies an algorithm to determine, based upon a predetermined or user-defined threshold, which mode would best represent the scene within the camera system's field of view. In another embodiment, based on size of identified objects of interest (for example human faces), an algorithm can be applied to determine, based upon a predetermined or user defined threshold, which mode would best represent the scene within the camera system's field of view.

Each of these techniques is discussed in more detail below.

Moving MLA102 from Light Field Position to Non-Light Field Position

In at least one embodiment, angular resolution is traded off for higher spatial resolution by moving MLA 102 closer to the surface of the image sensor 103. See, for example, U.S. Pat. No. 8,648,958, titled "Variable Imaging Arrangements and Methods Therefor", filed Jul. 5, 2012 and issued on Feb. 11, 2014, the disclosure of which is incorporated herein by reference.

According to at least one embodiment, MLA 102 can be moved to a specific distance from image sensor 103 (or from secondary optical element 117) so that the effective optical properties of MLA 102 can be completely neutralized. In this process, a minor visual perturbation of the image at the microlens interstitial region can be introduced. This minor loss of information at the interstitial region can be corrected by various computational methods, for example by interpolation of pixels surrounding the interstitial regions. In at least one embodiment, a calibration step is performed to characterize the interstitial pattern by imaging a diffuse white screen on image sensor 103. This calibration data is called a modulation image. To remove the perturbations in the interstitial areas, the inverse of the modulation image is multiplied with a captured image on a per-pixel basis. This process is called demodulation and it removes the intensity variations from the image due to MLA 102.

Moving MLA 102 sufficiently close to image sensor 103 (or to secondary optical element 117) causes MLA 102 to become optically inactive and lose its ability to focus light; this occurs because the microlenses are so far away from the optimal focus position. This is similar in principle to a magnifying glass at the maximum magnification position and moving closer to the object. When the magnifying glass moves spatially close enough to the object, it loses the lens effect and the object appears as it does without the magnifying lens in place.

Figure 5:
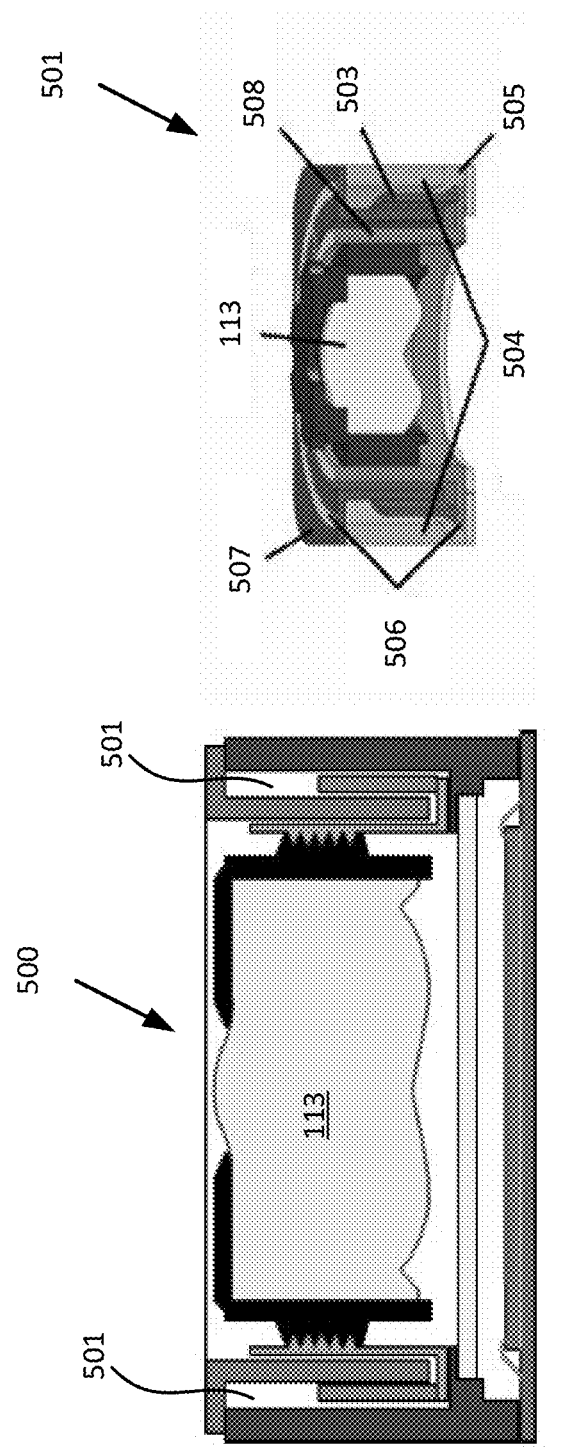
FIG. 5 depicts an example of a conventional non-MLA type camera module equipped with VCM actuation.

One exemplary embodiment of this approach for a mobile camera involves using a voice coil motor (VCM) actuating device. VCMs have been widely adopted for mobile cameras for auto-focus (AF) motor drive systems. For illustrative purposes, referring now to FIG. 5, there is shown an example of a conventional non-MLA type camera module 500 equipped with VCM actuation. VCM 501 is used to change the position of components such as main lens 113. The right-hand side of FIG. 5 depicts further details of VCM 501. Permanent magnets 504 are affixed to base 505. Coil 503 introduces a magnetic field that causes the assembly to move when electrical current is applied. This causes lens holder 508 and main lens 113 to shift position accordingly. Spring plates 506 cause the components to return to their original positions when the current is switched off. Yoke 507 guides the motion of VCM 501 and provides structural support for the components.

Figure 6:
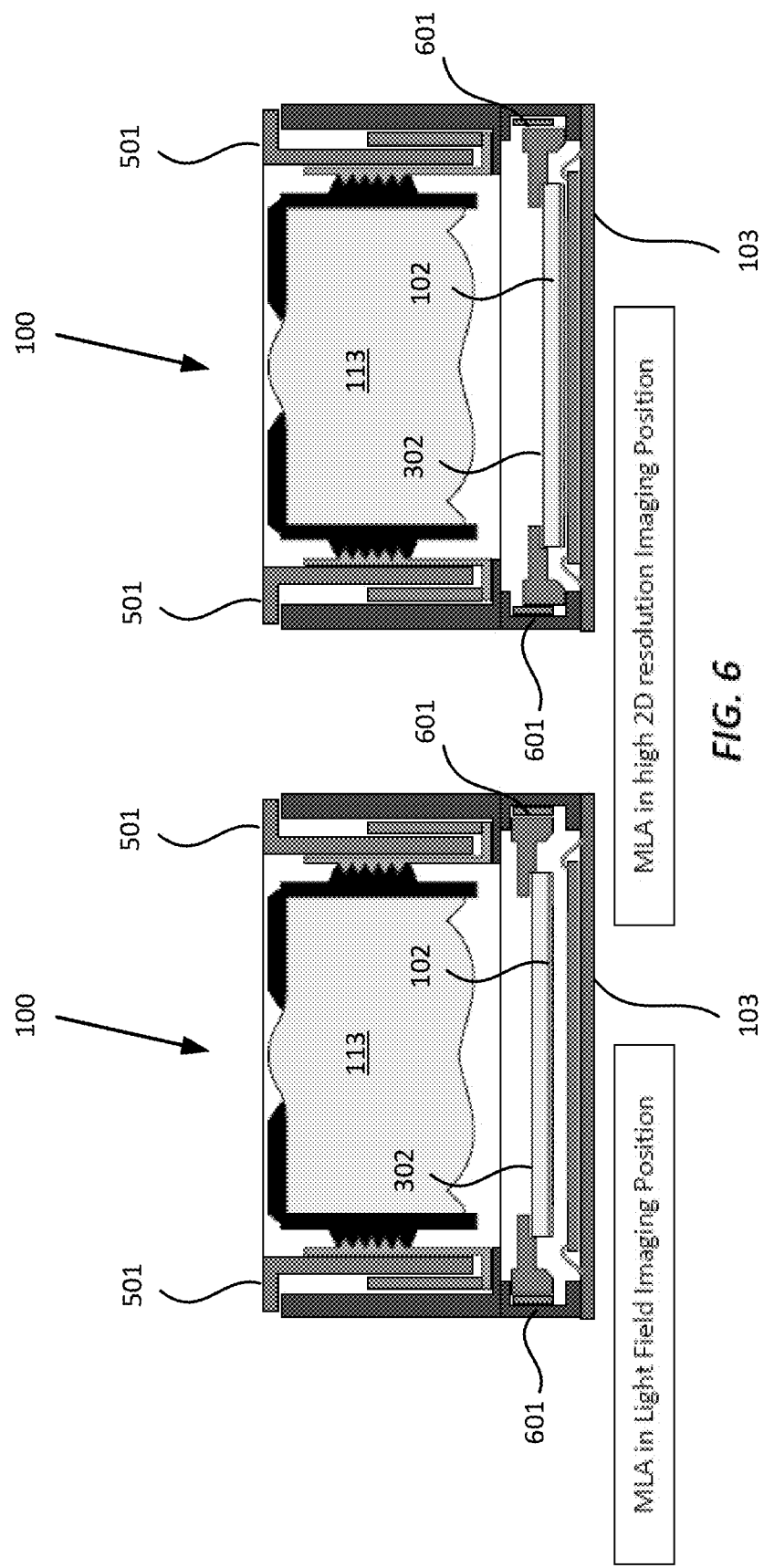
FIG. 6 depicts an exemplary embodiment for VCM-based actuation of the MLA for two-position operation, according to one embodiment.

Referring now to FIG. 6, there is shown an exemplary embodiment for implementing VCM-based actuation of MLA 102 for multi-position operation. The left-hand side of FIG. 6 shows MLA 102 in a position for light field imaging (i.e., with MLA 102 spaced apart from sensor 103), while the right-hand side shows MLA 102 in a position for high-resolution 2D imaging (i.e., with MLA 102 very close to sensor 103). Actuator 601 moves MLA 102 (along with substrate 302) from one position to the other in accordance with user commands or automated switching from one mode to the other. In at least one embodiment, intermediate positions are available as well.

FIG. 6 thus depicts one embodiment for configuring actuator 601 to operate between a first stop position for light field imaging, a second position for high-resolution 2D imaging, and any number of intermediate stop positions for intermediate forms of imaging. In at least one embodiment, VCM actuator 601 can over-drive MLA 102 into a precisely fabricated mechanical stop position with respect to the surface of image sensor 103, and thereby mitigate any tilt performance shortcomings.

In an alternative embodiment, a second VCM actuator can be incorporated for the AF actuation portion. This is shown in FIG. 6 by the presence of second VCM actuator 501, which performs a function similar to that depicted in FIG. 5. Second VCM actuator 501 is optional, but may be advantageous because it provide actuation capability for main lens 113 to adjust focus when MLA 102 is in the high-resolution 2D imaging position. Furthermore, when in the light field imaging position, the adjustability in main lens 113 position allows additional adjustment on the refocus range.

Figure 9:
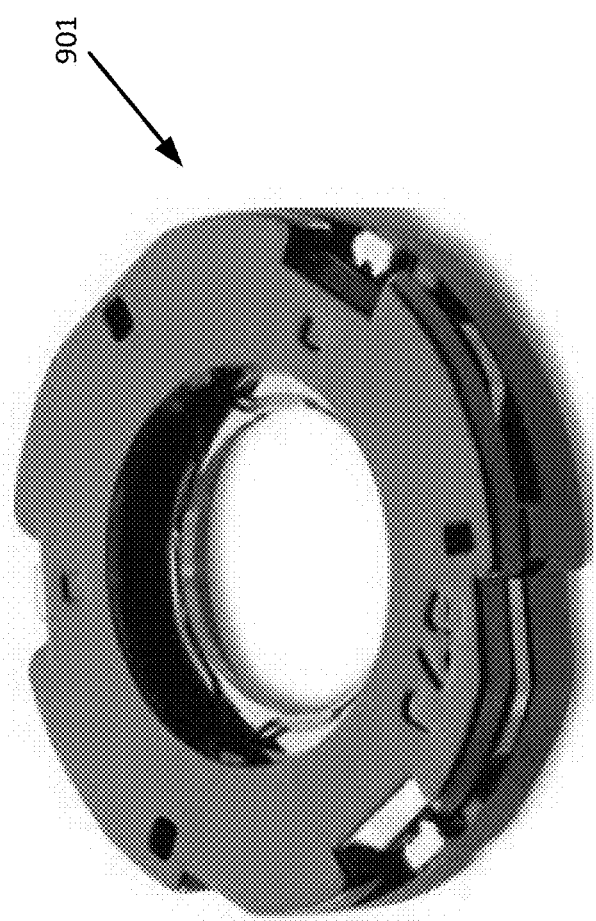
FIG. 9 depicts an example of a MEMS-based actuator for use in connection with one embodiment.

Any suitable actuator can be used, whether or not it is VCM-controlled. Example of actuators include microelectromechanical systems (MEMS) actuators, shape memory alloys, piezo-based transducers, electroactive polymer based transducers and other micro-actuation devices. Referring now to FIG. 9, there is shown an example of a MEMS-based actuator 901, available from Digital Optics Corporation (DOC). MEMS-based actuators such as actuator 901 generally have improved tilt control as compared with VCM actuators, with tilts of <=0.05 degrees being claimed. Additionally, MEMS-based actuators generally have improved translational repeatability, with +/−~1 um being claimed. Accordingly, in at least one embodiment, MEMS-based actuation of the MLA among the optically active, optically inactive, and partially active positions in the assembly may be performed to an acceptable accuracy without the use of physical stops included in the VCM-based configuration depicted in FIG. 6. In this case, accuracy of location of the MLA may actually be increased over that achieved in the case with stops in the case that debris and/or stray particulate matter becomes lodged between one of the stops and the moving MLA sub-assembly.

Additionally, in at least one embodiment, positioning accuracy of the MLA sub-assembly is further improved through the use of a real-time active feedback of image quality.

In at least one embodiment, shape memory alloy based actuators based on copper-aluminum-nickel or nickel-titanium alloy systems can be used; these may provide for faster switching between modes and for a smaller footprint than traditional VCM actuators.

In at least one embodiment, MLA 102 may be constructed using a deformable material, so that it can conform to the surface of sensor 103 (and/or secondary optical element 117) when pressed against it. The deformable MLA 102 can therefore provide even more direct pass-through of light to sensor 103, and can provide higher 2D resolutions by improving the degree to which MLA 102 can be disabled. In other embodiments, MLA 102 may be constructed of a non-deformable material.

Figure 21:
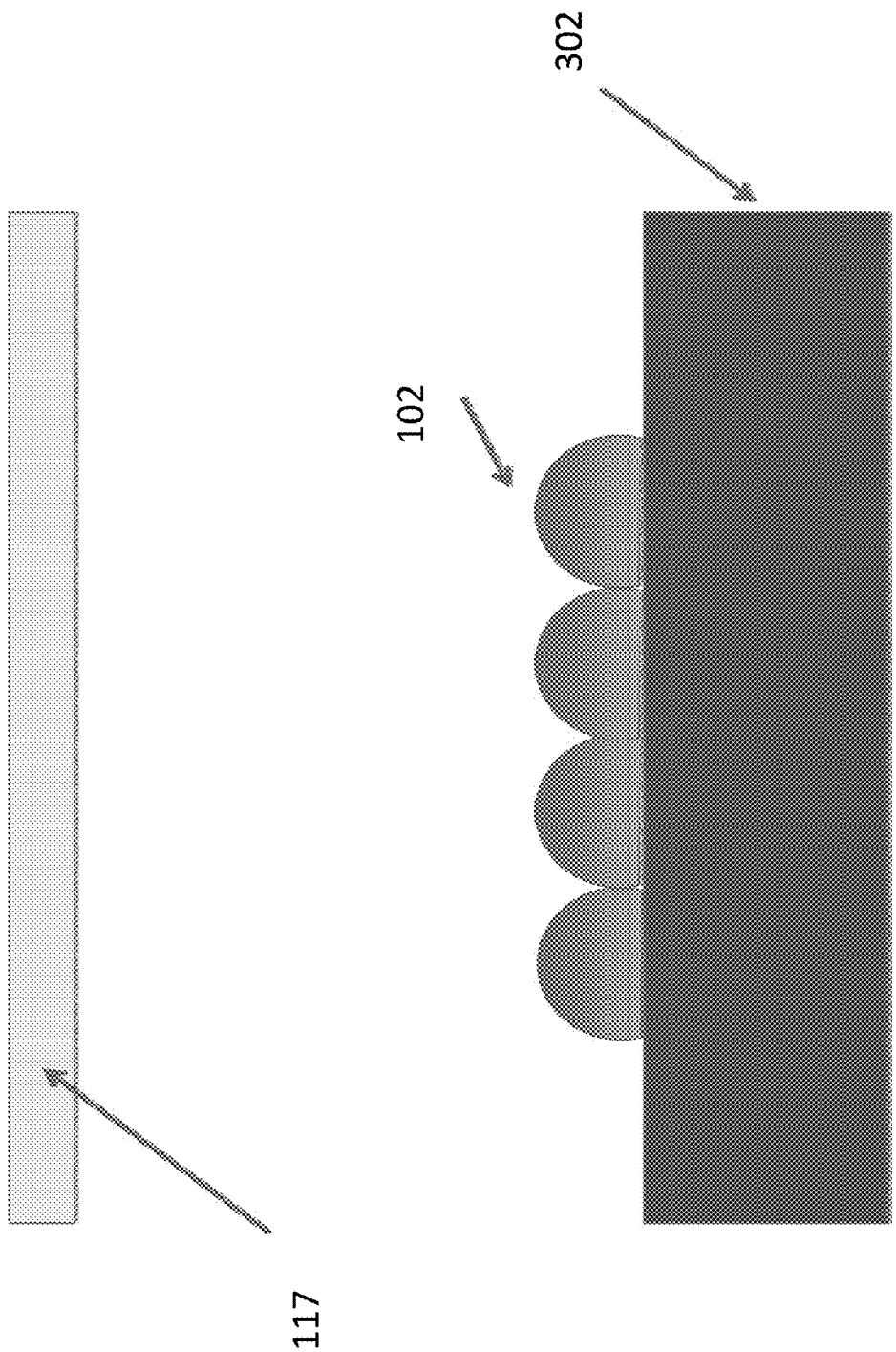
FIGS. 21 and 22 depict two positions of a movable secondary optical element with relation to a deformable microlens array, according to one embodiment.
Figure 22:
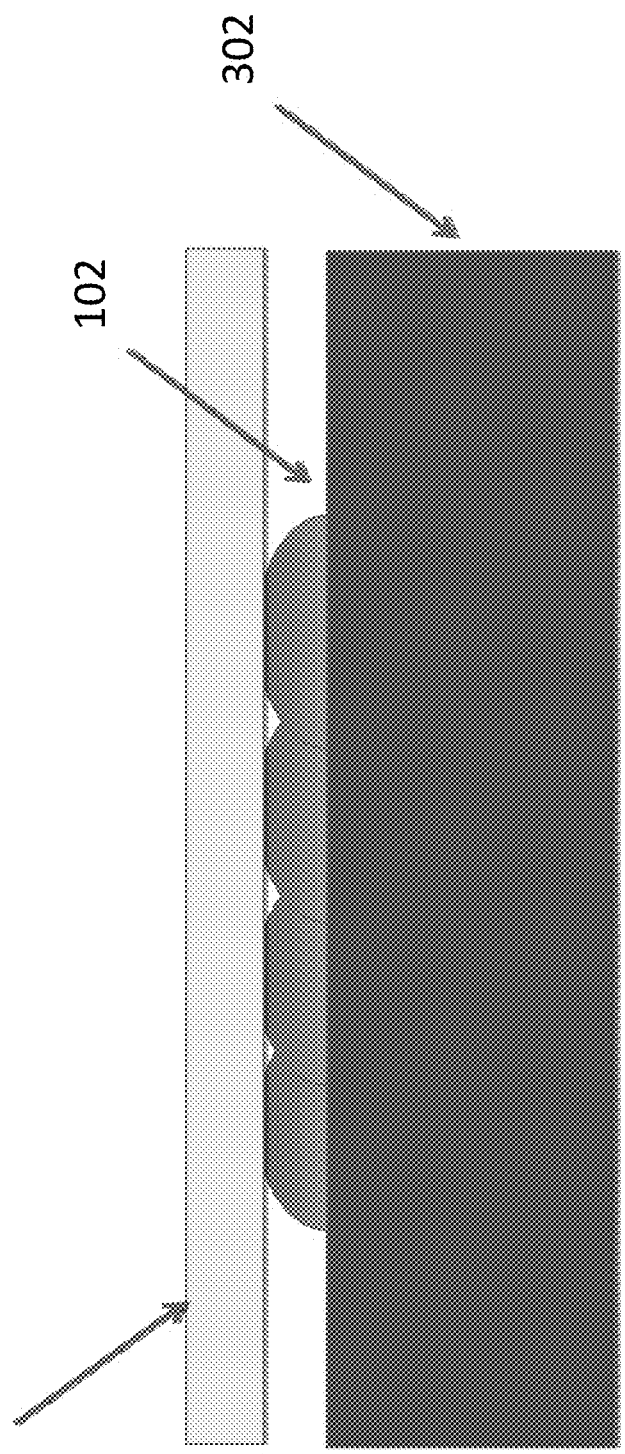

In at least one embodiment, rather than (or in addition to) moving MLA 102, secondary optical element 117 itself can be moved so that its position with relation to MLA 102 causes MLA 102 to be enabled or disabled. Referring now to FIGS. 21 and 22, there are shown examples of two positions of a movable secondary optical element 117 with relation to a deformable microlens array 102, according to one embodiment. As described above, secondary optical element 117 can be, for example and without limitation, a lens, an LCD, a flat or curved piece of polymer or glass, or the like. In this embodiment, secondary optical element 117 is moved with relation to MLA 102, so as to change the optical properties of MLA 102. In FIG. 21, MLA 102 is enabled, since there is space between it and secondary optical element 117. In FIG. 22, MLA 102 is disabled, since it is now in contact with secondary optical element 117. As can be seen in FIG. 22, MLA 102 is deformed as a result of contact with element 117, which deformation improves the contact with element 117.

Figures 1, 7:
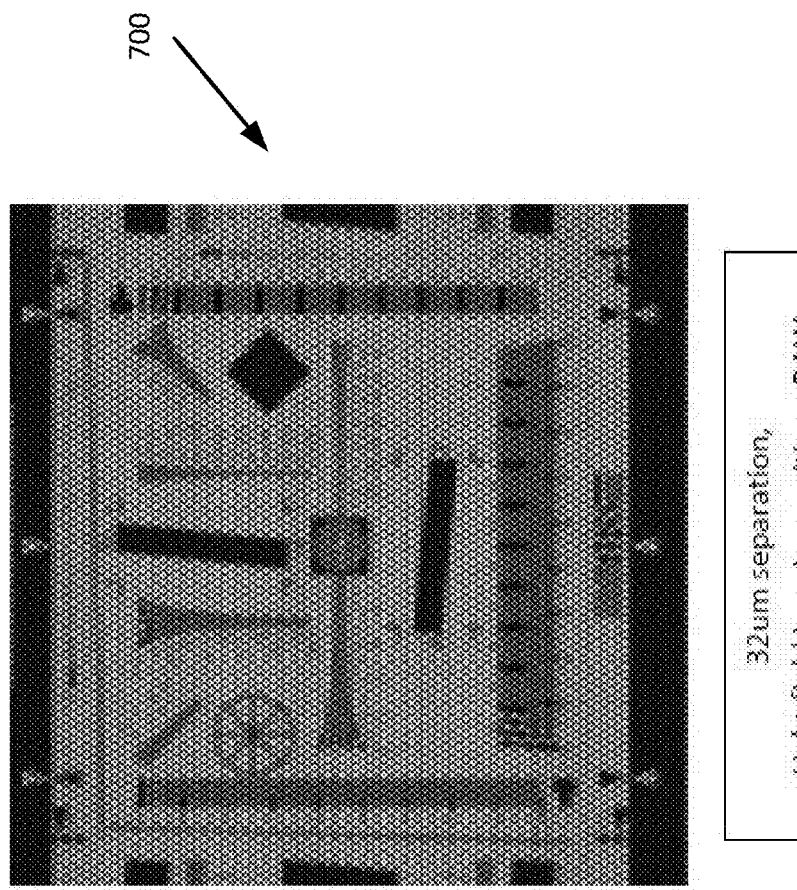

Referring now to FIGS. 7-1 and 7-2, there are shown exemplary simulation results of moving MLA 102 to various positions in front of the image sensor plane, according to one embodiment. At approximately 4 um of distance from image sensor 103, the effect of the MLA pattern can be corrected using algorithmic interpolation with a modulation image. FIG. 7-1 shows an example image 700 resulting from a light field camera system such as camera 100, with 32 um separation between MLA 102 and image sensor 103; this corresponds to light field imaging mode. FIG. 7-2 shows an example image 701 resulting from the same light field camera system such as camera 100, with 4 um separation between MLA 102 and image sensor 103; this corresponds to high-resolution 2D imaging mode. FIG. 7-2 also shows image 702, which is the result of application of algorithmic interpolation to image 701, to visually remove minor visual perturbation created by MLA 102 on image sensor 103, for example by using demodulation as described above.

Figure 8:
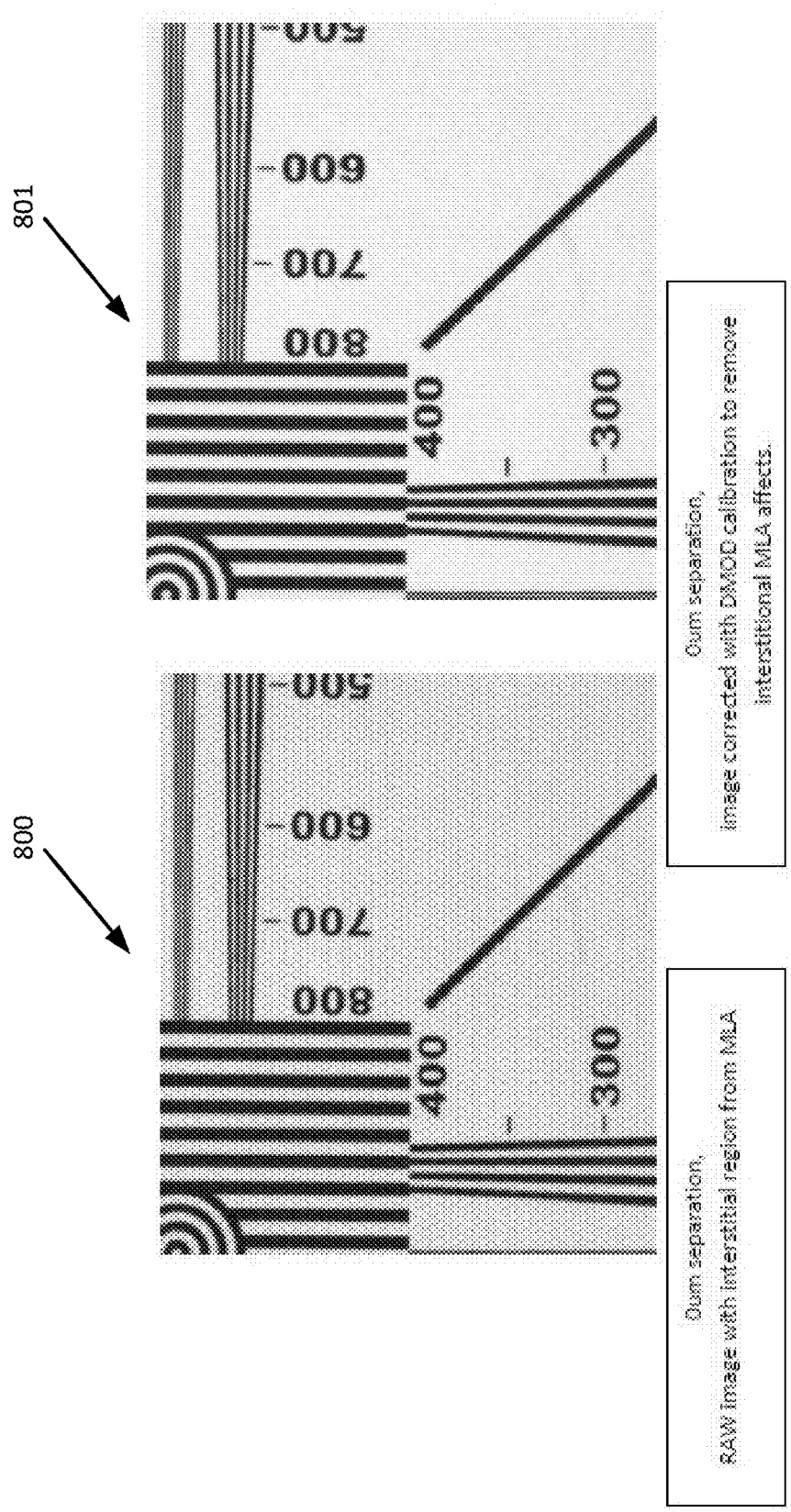
FIG. 8 depicts exemplary results collected by an embodiment with zero separation between MLA and sensor.

Referring now to FIG. 8, there are shown additional exemplary results. Example image 800 results from the same light field camera system such as camera 100, with 0 um separation between MLA 102 and image sensor 103; this corresponds to high-resolution 2D imaging mode. Image 801 is the result of application of demodulation calibration to remove interstitial MLA effects.

In another embodiment, MLA 102 can be moved out of the optical path altogether, for example by moving it in a sideways direction (i.e. parallel to the plane of image sensor 103). In this embodiment, MLA 102 is rendered optically ineffective by moving it to a position where light rays no longer pass through MLA 102 on their way to image sensor 103.

Index Matching Fluid Between MLA 102 and Image Sensor 103

Figure 10:
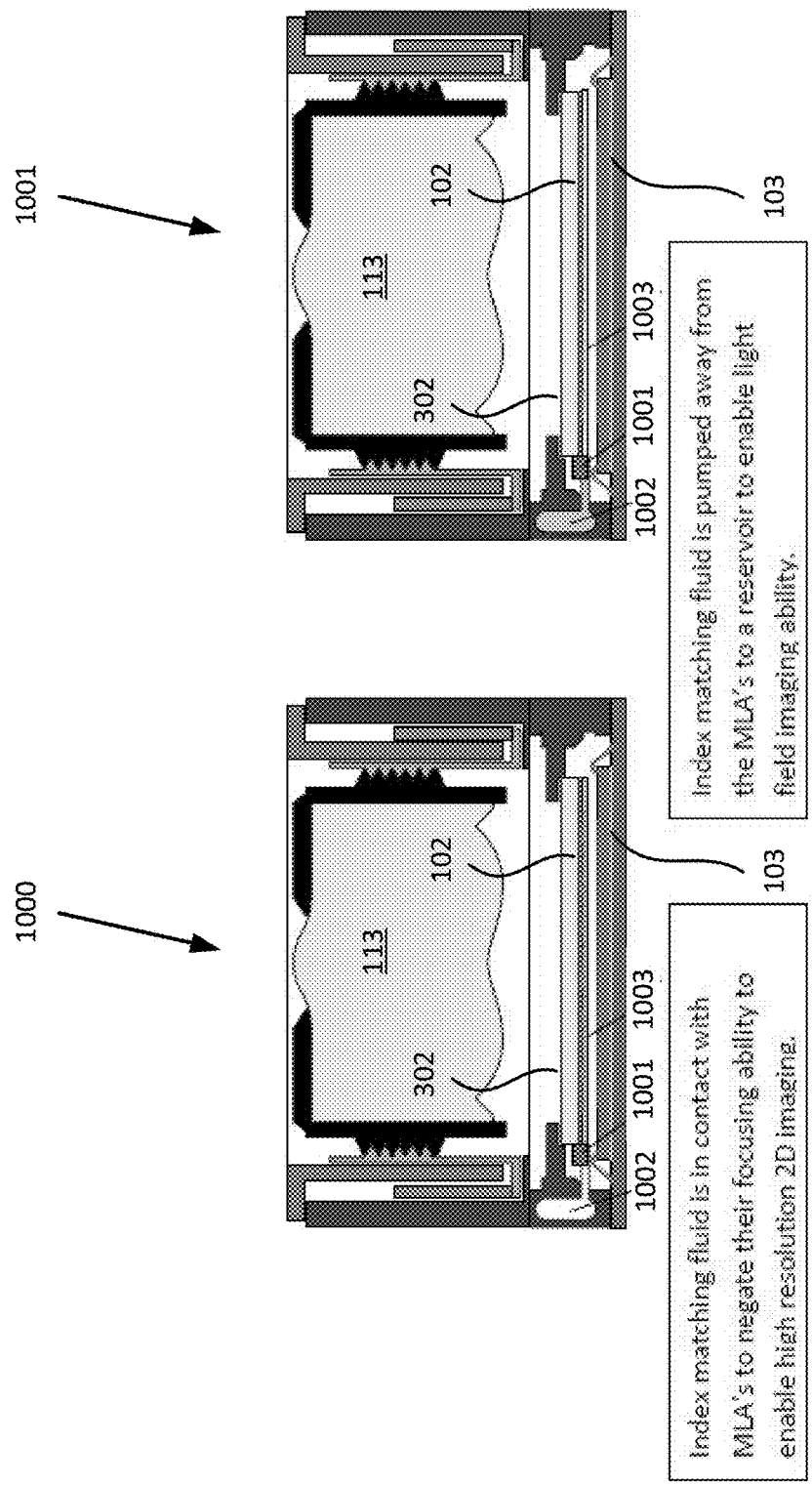
FIG. 10 depicts an exemplary embodiment of the use of index matching fluid to selectively remove MLA lens focus ability.

Referring now to FIG. 10, there is shown an example of an embodiment wherein the effect of MLA 102 is selectively removed by using a pump, such as micro-pump 1001, to move index-matching material, such as a fluid, between MLA 102 and image sensor 103. The index of refraction of the fluid is matched to the index of the MLA polymer material, so that when MLA 102 is covered with the fluid, the microlenses no longer act as focusing lenses. In configuration 1000, the fluid has been pumped into cavity 1003 adjacent to MLA 102 to remove the MLA lens focus ability. In configuration 1001, the fluid has been pumped out of cavity 1003 and is stored in reservoir 1002. Pump and valve assembly 1001 is used to selectively move the fluid between cavity 1003 and reservoir 1002, thereby switching between high-resolution 2D imaging mode (as shown in configuration 1000) and light field imaging mode (as shown in configuration 1001). Any suitable type of pump and valve can be used in assembly 1001.

So as to enable complete evacuation of the fluid from cavity 1003 when MLA 102 is to be made optically active, in at least one embodiment the following parameters are enforced: (i) the fluid has low viscosity [e.g. <1×10-3 Pa·s dynamic viscosity], and (ii) the fluid has low wetting to both MLA 102 and the opposing planar side of cavity 1003.

Figure 11:
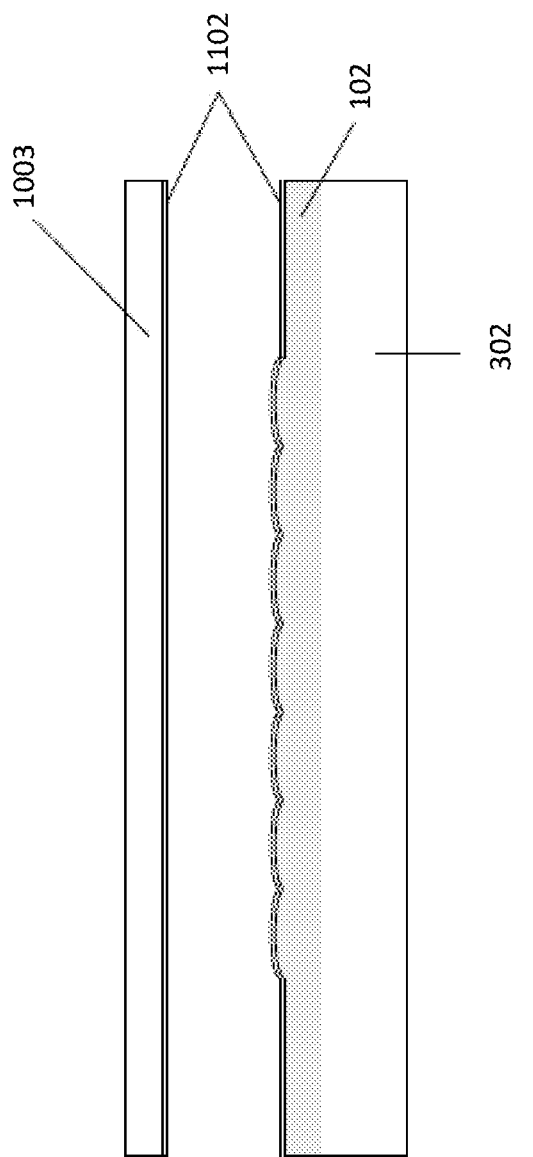
FIG. 11 depicts an exemplary embodiment of the use of index matching fluid in a cavity adjacent to the MLA, wherein low-wetting coating is applied to the MLA and opposing cavity wall.

In the case that the index matching fluid used is insufficiently non-wetting to both MLA 102 and the opposite surface of cavity 1003, optically-transparent surface modification layers may employed to improve non-wetting. Referring now to FIG. 11, there is shown such an embodiment, wherein low-wetting coating 1102 is applied to MLA 102 and opposing cavity wall 1101.

In the case that the index-matching fluid is polar, a surface modifying agent resulting in a non-polar surface such as polytetrafluoroethylene may be used. In the case that the index-matching fluid is non-polar, a surface coating resulting in a polar surface may be used. So as to ensure complete evacuation of cavity 1003 when the index matching fluid is removed from cavity 1003, the coating is preferably applied to the entire interior of cavity 1003.

Liquid Crystal Between MLA 102 and Image Sensor 103

Figure 12:
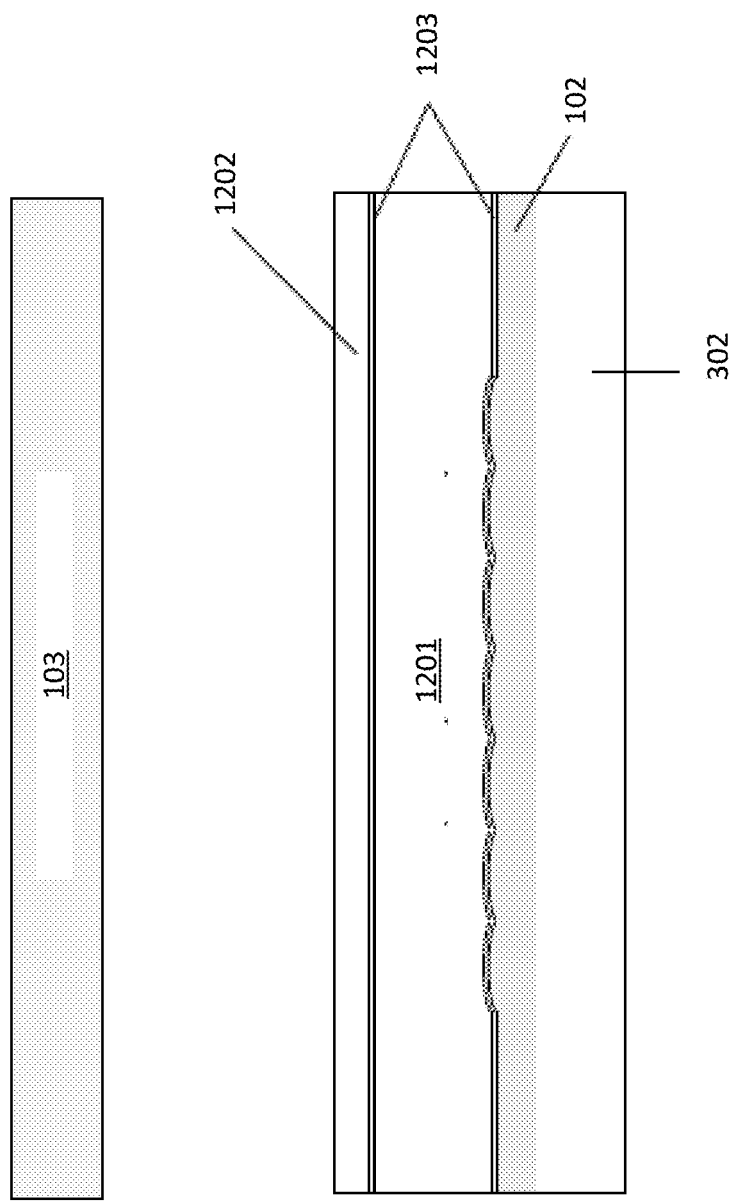
FIG. 12 depicts an exemplary embodiment of the use of liquid crystal in a cavity adjacent to the MLA, wherein the liquid crystal has optical properties dependent on the orientation of the liquid crystal molecules.

Referring now to FIG. 12, there is shown an exemplary embodiment of the use of liquid crystal in cavity 1201 adjacent to MLA 102, wherein the liquid crystal has optical properties dependent on the orientation of the liquid crystal molecules. Transparent electrodes 1203, made of indium tin oxide (ITO) or any other appropriate material, are provided on MLA 102 and on cavity wall 1202 opposing MLA 102. Additional metallization outside the active area may be performed as needed. The default orientation and pre-tilt of the liquid crystal is determined by the application of a textured coating over the top of the electrode surface, often called a command surface.

In an alternative embodiment, the transparent electrode 1203 on MLA 102 may be placed between MLA 102 and MLA support substrate 302. This can be useful, for example, if a polymer-on-glass MLA 102 is used which the polymer MLA 102 may become denatured during deposition and patterning of the ITO. In this case, the textured surface encouraging default orientation of the liquid crystals is positioned on the top surface of MLA 102, in direct contact with the liquid crystal (as opposed to directly on top of the ITO electrode).

Figure 13:
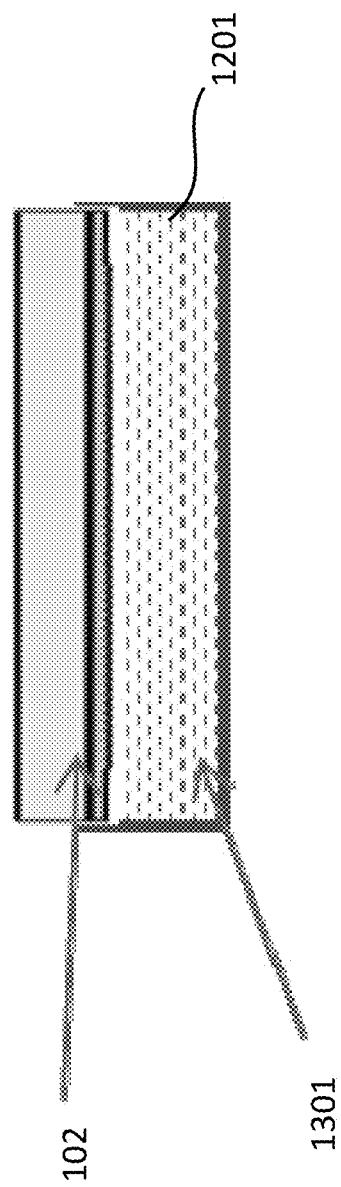
FIG. 13 depicts a default orientation of liquid crystal molecules relative to the MLA (with no electric field applied between the electrodes), according to one embodiment.
Figure 14:
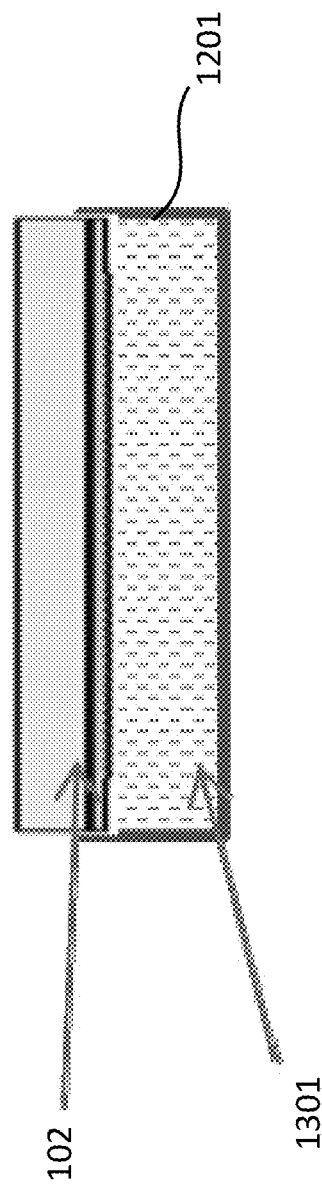
FIG. 14 depicts re-orientation of liquid crystal molecules after application of an electric field between the electrodes, according to one embodiment.

Referring now to FIGS. 13 and 14, there are shown two orientations of liquid crystal molecules relative to MLA 102, to select between light field acquisition mode and high-resolution 2D image mode. In at least one embodiment, the default orientation of the liquid crystal molecules 1301 in cavity 1201 relative to MLA 102 (with no electric field applied between electrodes 1203) is shown in FIG. 13. In this orientation, the liquid crystal has a first effective refractive index to light propagating in a direction perpendicular to the MLA substrate.

Applying an electric field between electrodes 1203 results in re-orientation of the liquid crystal molecules 1301, as depicted in FIG. 14. In this orientation, the liquid crystal has a second effective refractive index.

Embodiments providing intermediate modes are described in more detail below.

In the case that the refractive index in one of the above configurations matches or is close to that of the MLA material, MLA 102 can be rendered optically disabled. In the case that the refractive index in alternative configurations is sufficiently different to that of the MLA material, MLA 102 can be rendered optically enabled. In this manner, two modes of operation are provided: one with a functional MLA 102 for capture of light field images, and one in which MLA 102 is disabled for capture of 2D images.

Liquid Crystal MLA

Figure 15:
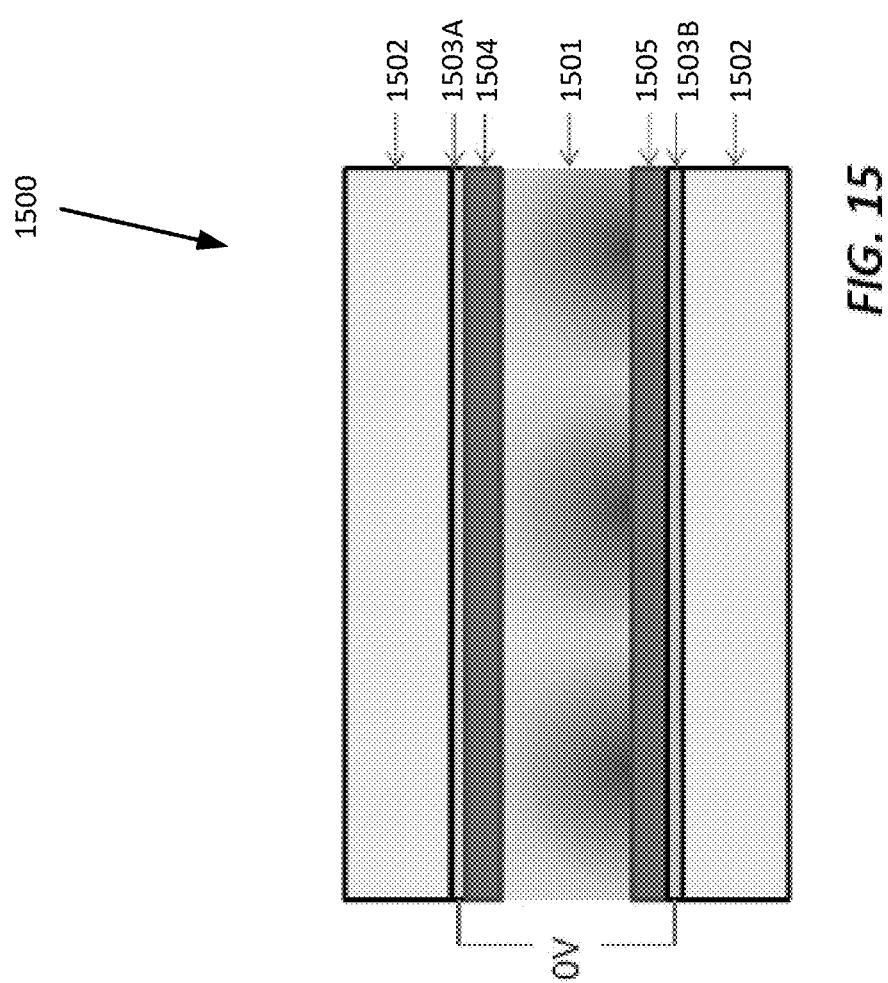
FIGS. 15 and 16 depict an embodiment in which a microlens array is defined in liquid crystal.
Figure 16:
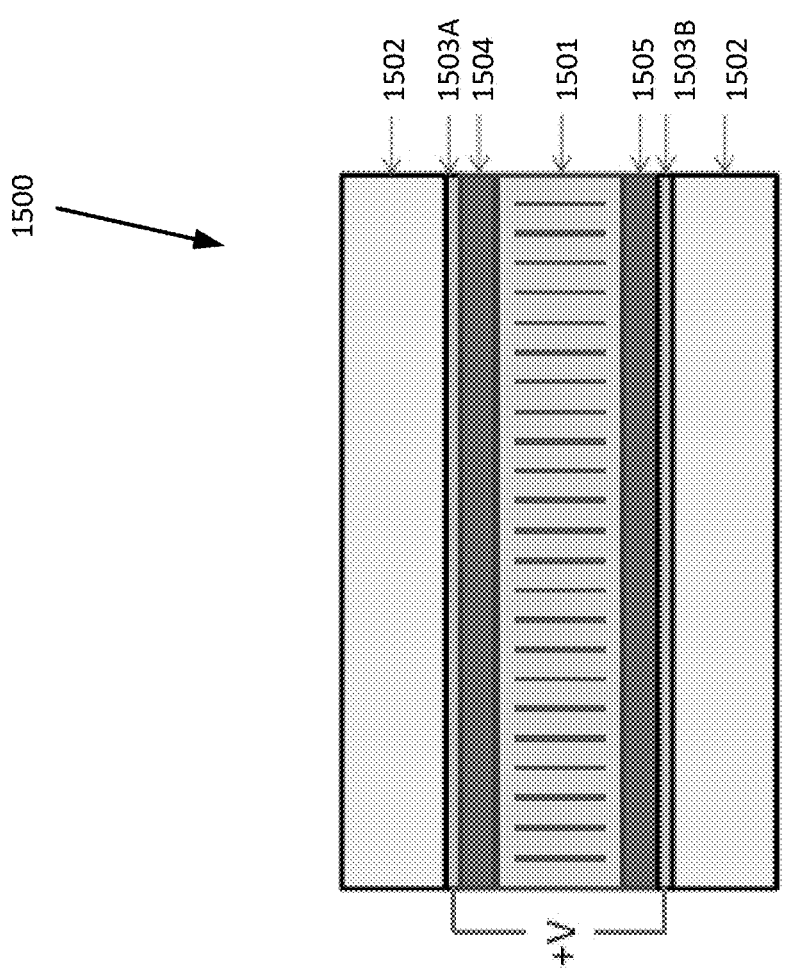

Referring now to FIGS. 15 and 16, there is shown an embodiment 1500 in which a microlens array is defined in liquid crystal 1501. The arrangement consists of an ITO coated glass cell, wherein indium tin oxide (ITO 1503), or some other suitable material, is used to coat glass layers 1502. As shown in FIG. 15, one ITO layer 1503B has a patterned alignment layer 1505, and the other ITO layer 1503A has a uniform alignment layer 1504. A liquid crystal layer 1501 is situated between layers 1504 and 1505 of ITO 1503A and 1503B. When no voltage is applied to the cell, the most energetically favorable state is for liquid crystal 1501 to align to the patterned features on either side; effectively, the patterned alignment layer 1505 defines the orientation of liquid crystal 1501. A lensing effect can be produced by varying the orientation and pre-tilt angle of liquid crystal 1501 to generate a gradient in the refractive index of liquid crystal 1501 and therefore cause liquid crystal 1501 to act as a lens. The orientation change to liquid crystal 1501 thus alters the effective refractive index of liquid crystal 1501 by rotating the index ellipsoid.

To turn liquid crystal 1501 off, an electric field is applied between the two ITO layers 1503A, 1503B, as shown in FIG. 16. When the field is applied, the molecules of liquid crystal 1501 reorient themselves so that they are aligned parallel to the electric field, eliminating any index gradient. Liquid crystal 1501 is thus uniformly aligned perpendicular to glass layers 1502, so that there is no refractive index change for light normally incident to the device, and liquid crystal layer 1501 no longer acts like a lens. In this manner, an MLA defined by liquid crystal 1501 can be selectively enabled, disabled, or partially enabled, to implement multiple modes of operation: one with a functional MLA for capture of light field images, one in which MLA is disabled for capture of 2D images, and any number of intermediate modes in which the MLA is partially enabled. Embodiments providing intermediate modes are described in more detail below.

Electro-Optical Material Fresnel MLA

Figure 17:
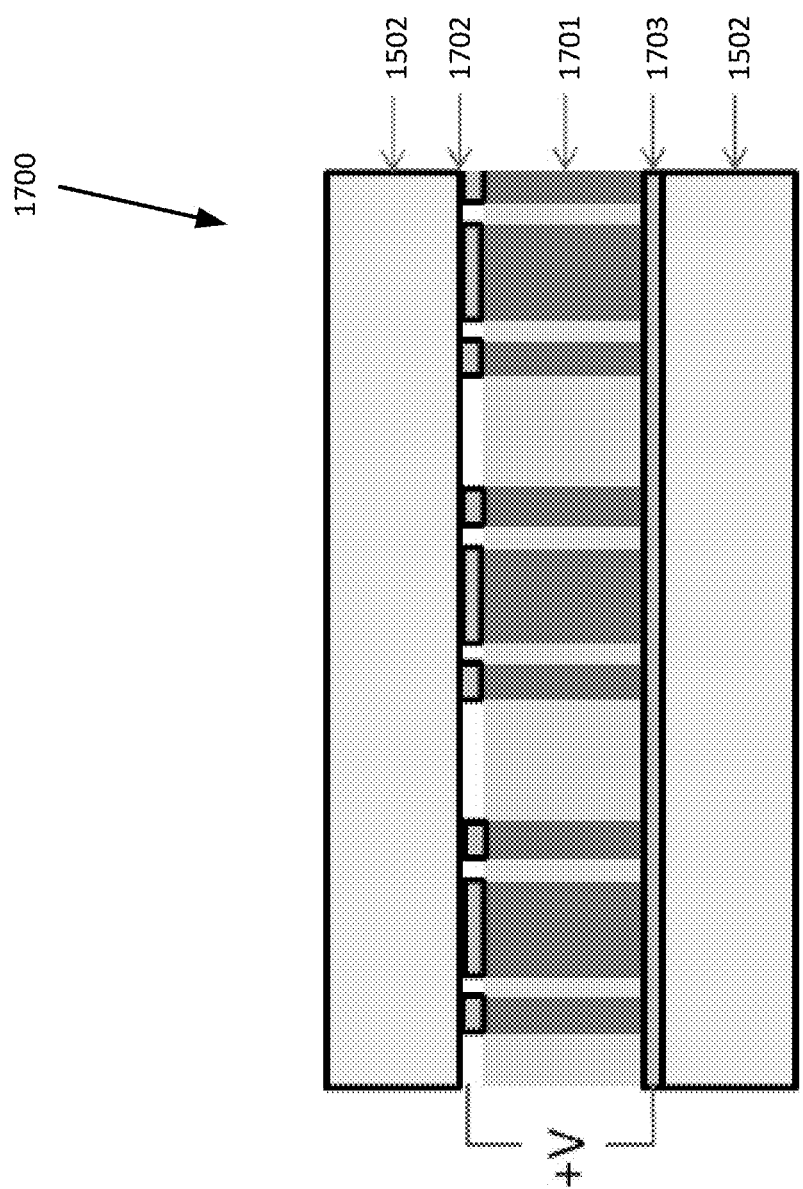
FIGS. 17 and 18 depict an embodiment wherein a microlens array can be deactivated using electro-optic material.
Figure 18:
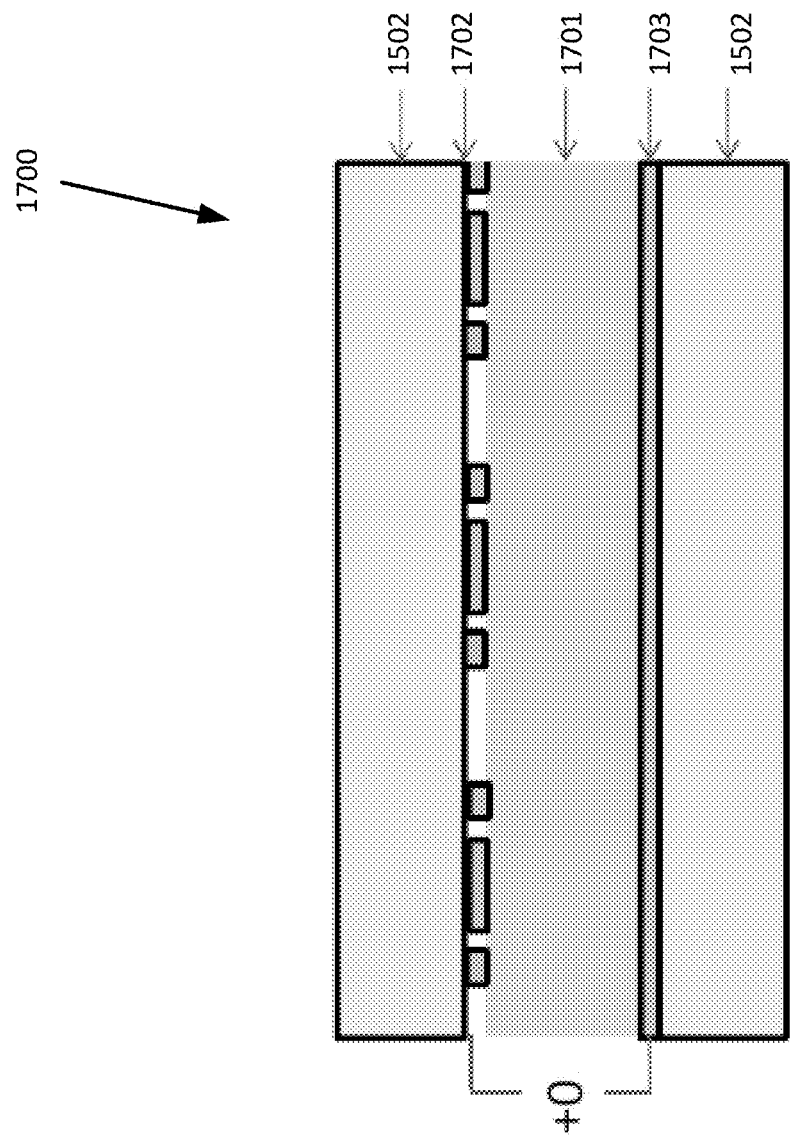

Referring now to FIGS. 17 and 18, there is shown an embodiment 1700 wherein a microlens array can be selectively activated, deactivated, or partially activated using electro-optic material 1701 such as an electro-optic polymer. Electro-optic material 1701 has a changeable refractive index that is proportional to an applied electric field. FIG. 17 shows an example of a Fresnel microlens array defined in such electro-optic material 107. The quality of a Fresnel lens is proportional to how many zones and phase levels it has. For illustrative purposes, FIG. 17 depicts a lens with four zones and two phase levels (i.e., binary). In various embodiments, higher quality lens arrays can be made using any number of zones with any number of phase levels, such as, for example, four, eight, or more phase levels.

As shown in FIG. 17, to turn the lens on, a voltage corresponding to a pi phase change is applied to between patterned ITO layer 1702 and uniform ITO layer 1703. When a voltage is applied between patterned ITO layer 1702 and uniform ITO layer 1703, a Fresnel lens is formed by electro-optic material 1701.

As shown in FIG. 18, when no voltage is applied, electro-optic material 1701 has a uniform refractive index and does not act like a lens.

Application of intermediate voltage can be used to select intermediate modes wherein the lens is partially activated.

In at least one embodiment, ITO layers 1702, 1703 may be coated at a thickness that results in a 2*pi phase shift in the light so that layers 1702, 1703 do does not act as a Fresnel lens themselves. Other configurations and arrangements are possible.

Intermediate Image Capture Modes

As described above, in at least one embodiment, one or more intermediate image capture modes can be enabled, wherein the image capture apparatus is configured between two modes described above (the light field image capture mode and the 2D image capture mode). In at least one embodiment, some discrete number of intermediate image capture modes can be provided. In at least one other embodiment, the transition between light field image capture mode and 2D image capture mode can be continuous, so that any number of intermediate modes can be provided, in effect providing a continuum of intermediate modes.

Intermediate modes can be useful in many situations. In general, light field image capture capability comes at the expense of image capture resolution. This is because, in general, a fixed number of sensor pixels are available: therefore, a 2D image capture mode is able to capture images at higher resolution because less data is being captured for each point within the image. Introduction of the microlens array (MLA) to enable light field image capture necessitates the use of more sensor pixels to capture the additional information inherent in light field imagery. An intermediate capture mode is advantageous because it permits an intermediate (or even continuous) tradeoff between captured resolution and richness of captured light field image data. An intermediate mode can therefore provide an intermediate level of resolution while also capturing some intermediate granularity of light field image data. In essence, the quantity of light field image data captured in the intermediate mode is less than the quantity of light field data captured in the full light field image capture mode. For example, light field data can be captured at a finer level of granularity in the full light field image capture than in the intermediate mode. In at least one embodiment, the tradeoff can be continuous, and image capture can even occur while the capture mode is gradually changed; this allows for capture of images (and/or video) while the mode is changed without introducing jarring discontinuities.

Figure 23:
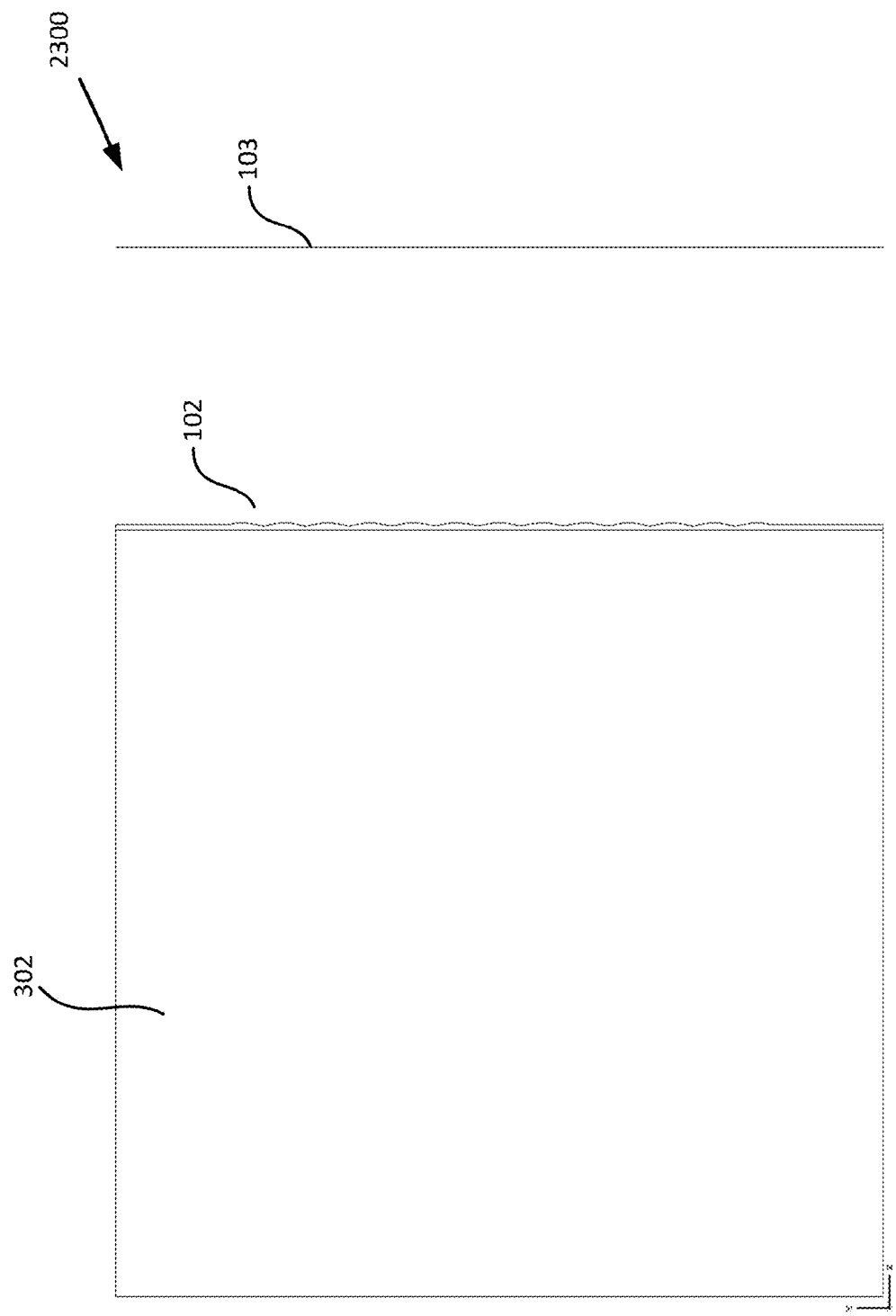
FIG. 23 depicts an example of an image capture apparatus having multiple modes, according to one embodiment.

Referring now to FIG. 23, there is shown an example of an image capture apparatus 2300 having multiple modes, according to one embodiment. As described above, MLA 102 is formed from substrate 302. Light passes through substrate 302 and MLA 102 to reach sensor 103, where image capture occurs.

Figure 24:
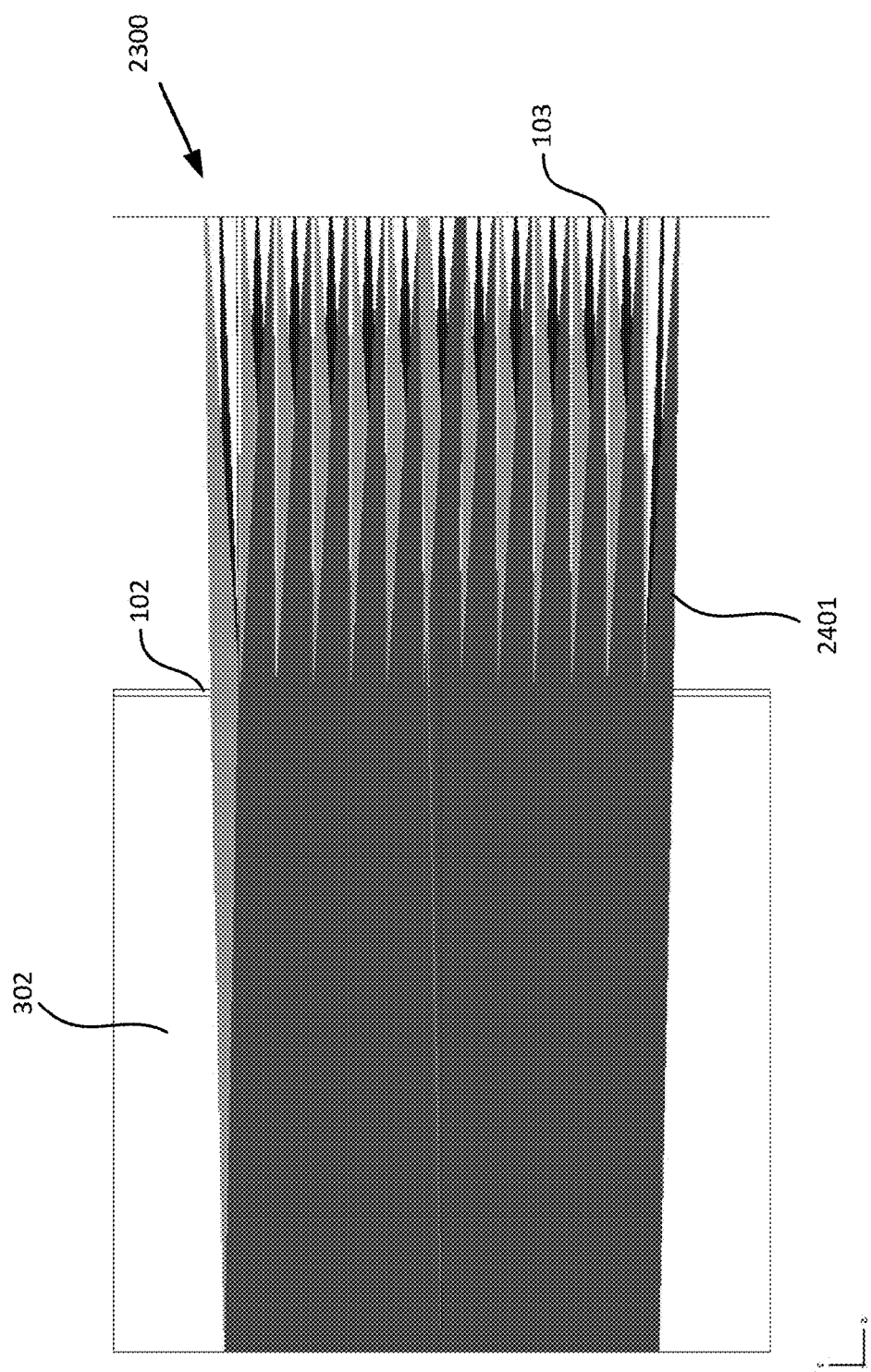
FIG. 24 depicts an example of an image capture apparatus in a light field capture mode, wherein the MLA is enabled, according to one embodiment.

According to the various techniques described above, MLA 102 can be selectively activated or deactivated. Referring now to FIG. 24, there is shown an example of image capture apparatus 2300 in a light field capture mode, wherein MLA 102 is enabled, according to one embodiment. FIG. 24 depicts rays 2401 being directed by MLA 102 onto sensor 103 in a manner that enables capture of full light field data. The illustration shows rays being focused onto the image capture plane at an optimal focal distance for capturing light field data.

Figure 25:
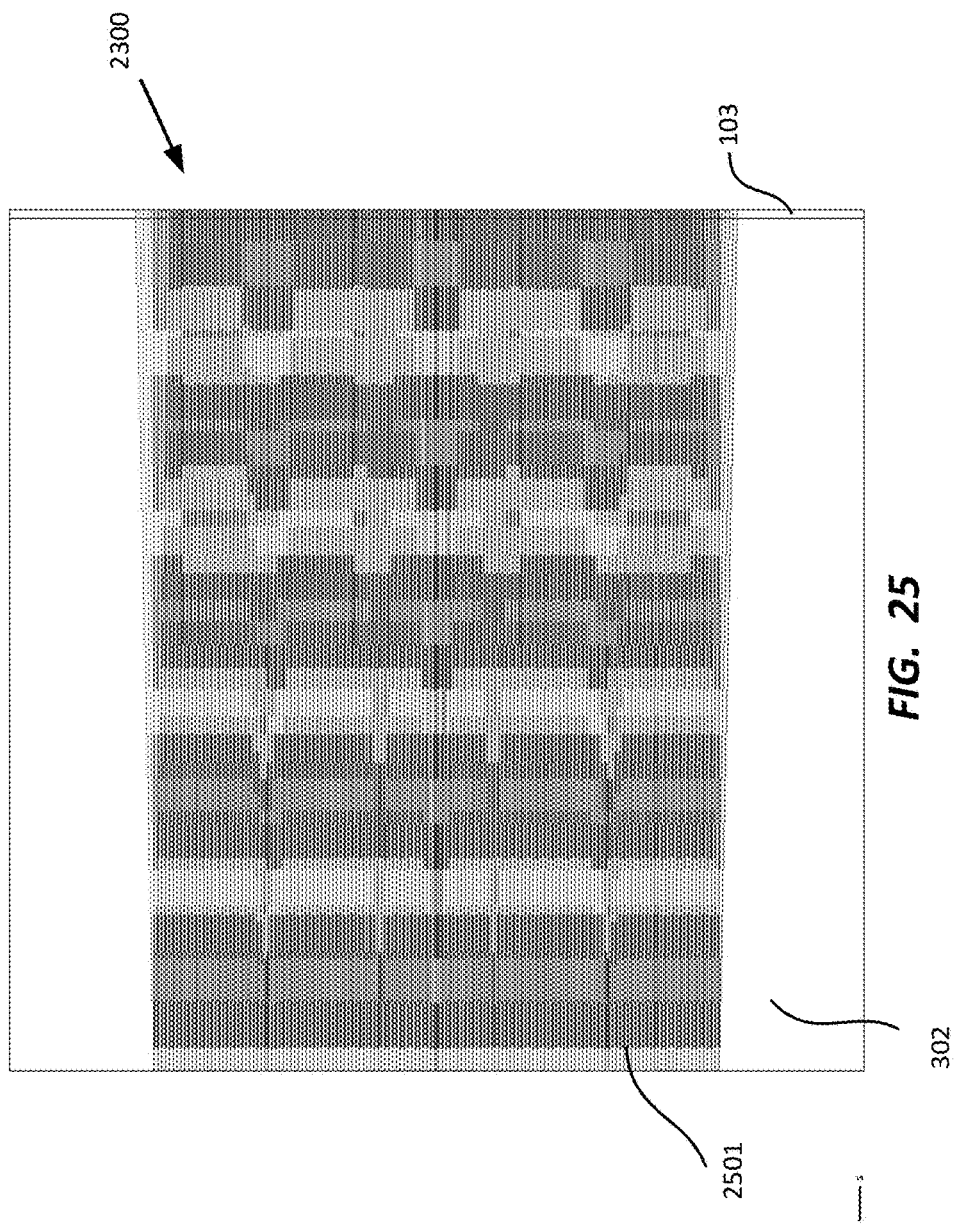
FIG. 25 depicts an example of an image capture apparatus in a 2D image capture mode, wherein the MLA is disabled, according to one embodiment.

Referring now to FIG. 25, there is shown an example of image capture apparatus 2300 in a 2D image capture mode, wherein MLA (not shown) is disabled, according to one embodiment. FIG. 25 depicts rays 2501 being directed from image plane 2502 onto sensor 103 in a manner that enables capture of 2D image data. The defocus at image sensor 103 (illustrated by green rays 2503 and red rays 2504 at the edges of the ray bundle) is due to the main lens needing to be adjusted to focus on the image sensor plane rather than on the MLA. As can be seen, the image capture resolution is higher than that of FIG. 24, although no light field data is captured.

Figure 26:
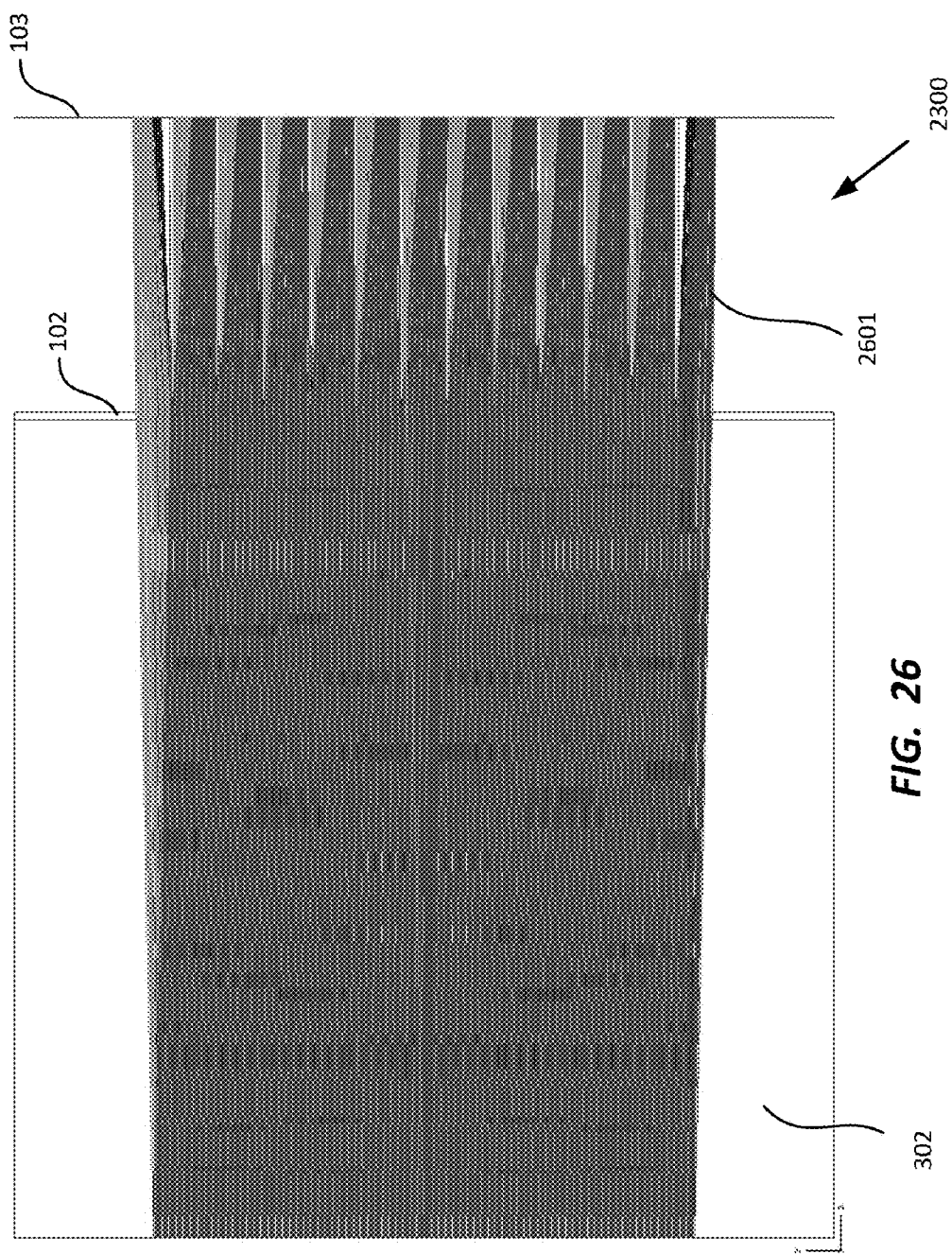
FIG. 26 depicts an example of an image capture apparatus in an intermediate mode, wherein the MLA is partially enabled, according to one embodiment.

Referring now to FIG. 26, there is shown an example of image capture apparatus 2300 in an intermediate mode, wherein MLA 102 is partially enabled, according to one embodiment. FIG. 26 depicts rays 2601 being directed by MLA 102 onto sensor 103 in a manner that enables capture of some light field data while providing higher resolution than the configuration of FIG. 24. In at least one embodiment, any number of such intermediate modes can be provided. Images can be captured at any of such modes, and can even be captured during movement from one mode to another. In this intermediate capture state, rays 2601 are not fully focused on the image plane (in contrast to FIGS. 24 and 25), some light field data is being captured.

Figure 27:
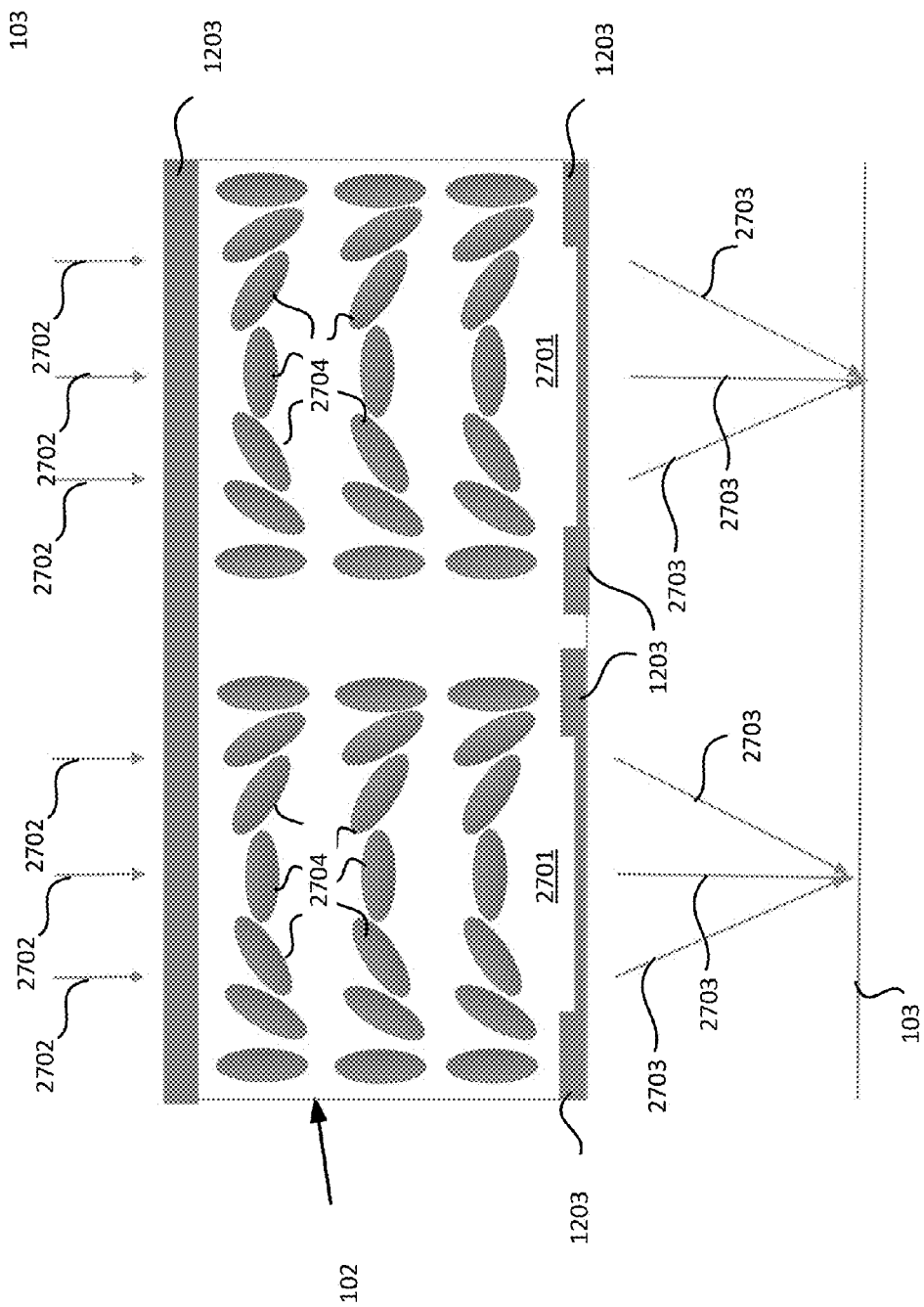
FIG. 27 depicts an example of an optical layout for two liquid crystal microlenses of an image capture apparatus in a light field image capture mode, according to one embodiment.

Referring now to FIG. 27, there is shown an example of an optical layout for two liquid crystal microlenses 2701 within an MLA 102 of an image capture apparatus in a light field image capture mode, according to one embodiment. Liquid crystal elements 2704 are arranged so that microlenses 2701 are active. This can be done using the techniques described above in connection with FIGS. 13 and 14; for example, by providing liquid crystal that has optical properties dependent on the orientation of the liquid crystal molecules, and by providing electrodes 1203 to selectively change the state of liquid crystal elements 2704 to attain active mode.

Also depicted in FIG. 27 are incoming rays 2702 and outgoing rays 2703. As can be seen, in this mode, outgoing rays 2703 are focused by MLA 102 onto specific sensor locations on sensor 203.

Figure 28:
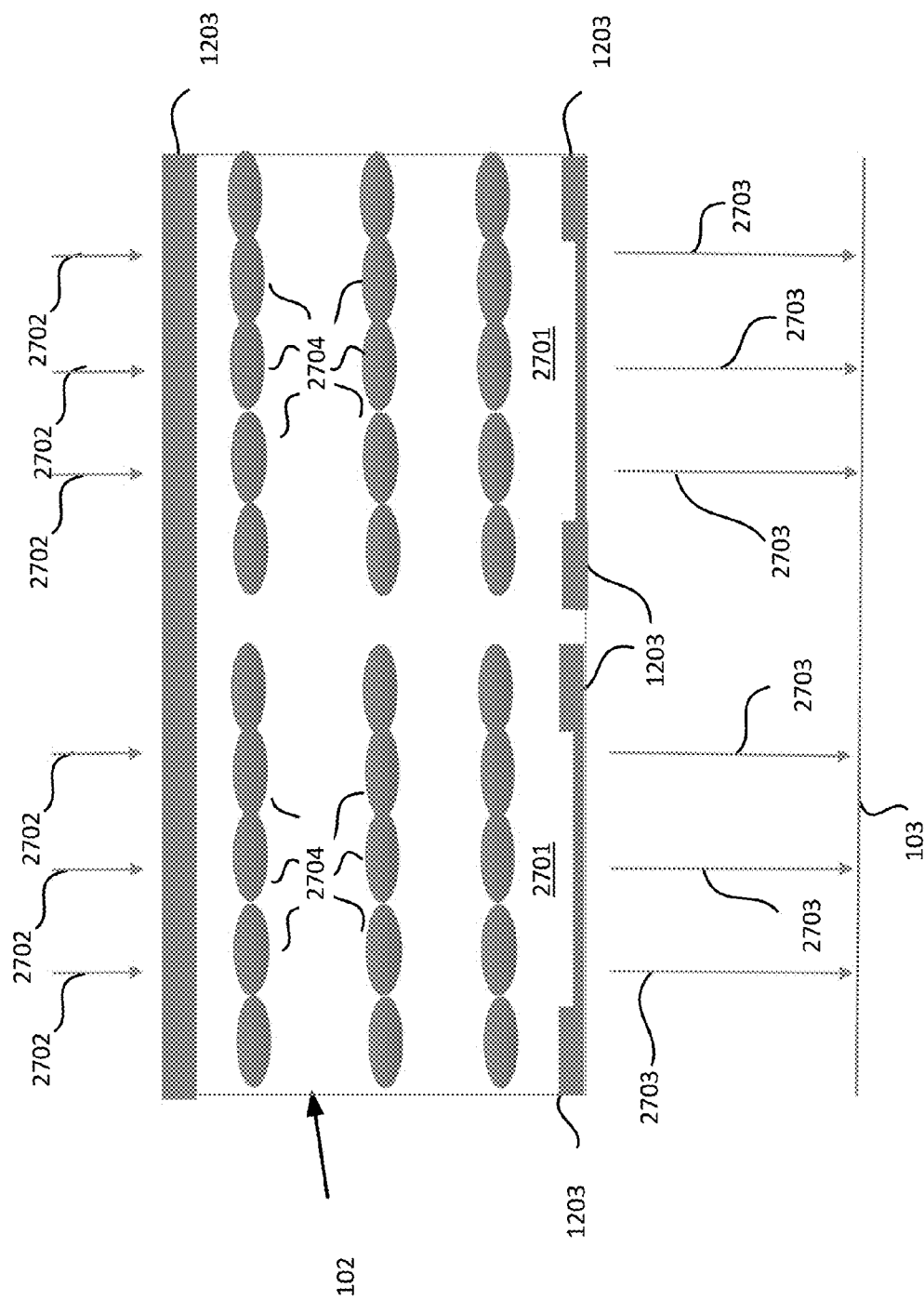
FIG. 28 depicts an example of an optical layout for two liquid crystal microlenses of an image capture apparatus in a 2D image capture mode, according to one embodiment.

Referring now to FIG. 28, there is shown an example of an optical layout for two liquid crystal microlenses 2701 within an MLA 102 of an image capture apparatus in a 2D image capture mode, according to one embodiment. Liquid crystal elements 2704 are arranged so that microlenses 2701 are disabled. This can be done using the techniques described above in connection with FIGS. 13 and 14; for example, by providing liquid crystal that has optical properties dependent on the orientation of the liquid crystal molecules, and by providing electrodes 1203 to selectively change the state of liquid crystal elements 2704 so as to disable microlenses 2701 by making them optically transparent. Specifically, in this configuration, all liquid crystal elements 2704 are horizontally oriented.

Also depicted in FIG. 28 are incoming rays 2702 and outgoing rays 2703. As can be seen, in this mode, outgoing rays 2703 continue on their parallel path toward sensor 203, indicating that in this configuration, microlenses 2701 are optically transparent.

Figure 29:
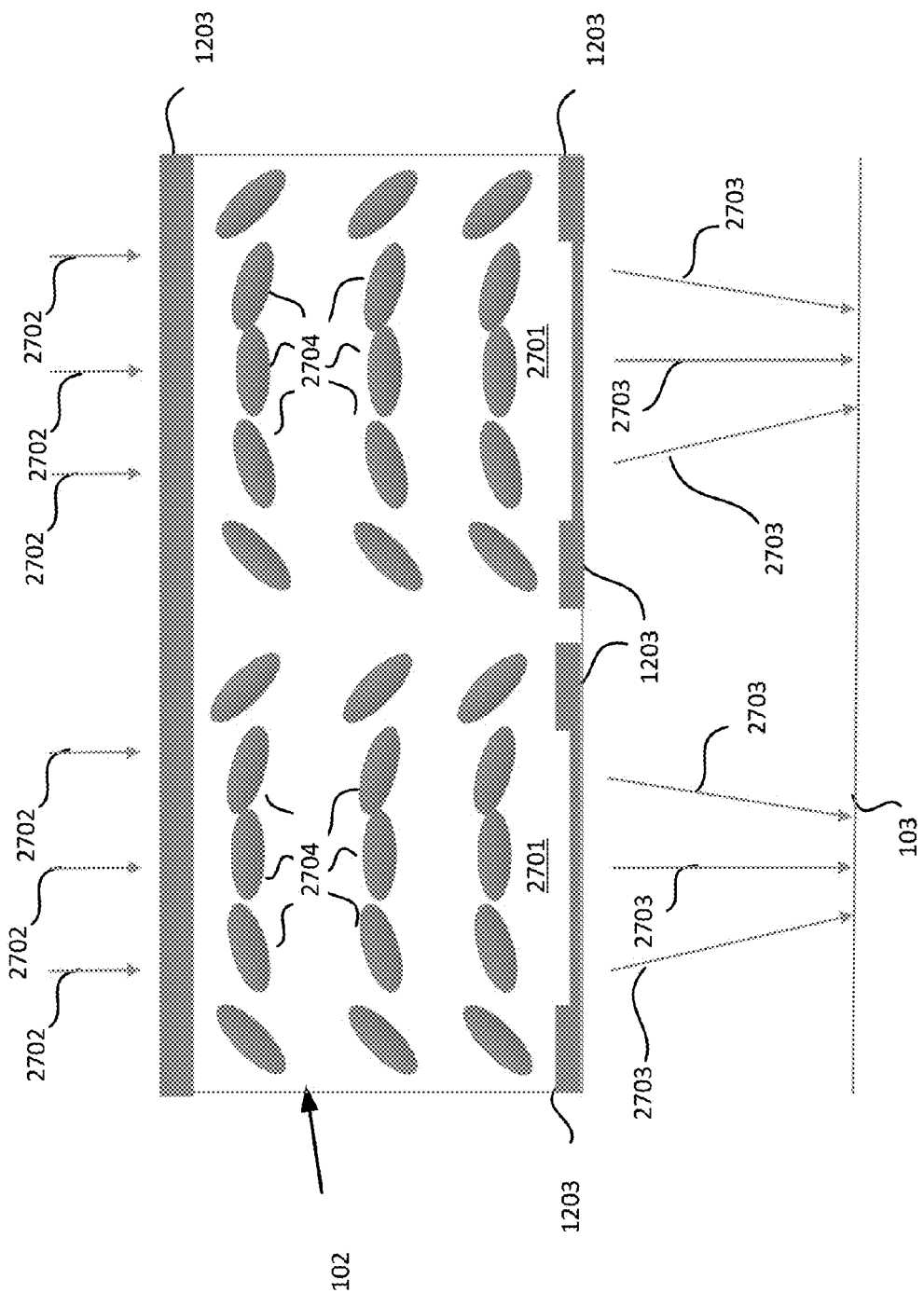
FIG. 29 depicts an example of an optical layout for two liquid crystal microlenses of an image capture apparatus in an intermediate image capture mode, according to one embodiment.

Referring now to FIG. 29, there is shown an example of an optical layout for two liquid crystal microlenses 2701 within an MLA 102 of an image capture apparatus in an intermediate image capture mode, according to one embodiment. Liquid crystal elements 2704 are arranged so that microlenses 2701 are partially active; some of the elements are angled as in FIG. 27, while others are more horizontally oriented than they were in FIG. 27. Again, this can be done, for example, by providing liquid crystal that has optical properties dependent on the orientation of the liquid crystal molecules, and by providing electrodes 1203 to selectively change the state of liquid crystal elements 2704 to attain active mode. A charge of intermediate level can be applied to electrodes 1203 to attain this intermediate state.

Also depicted in FIG. 29 are incoming rays 2702 and outgoing rays 2703. As can be seen, in this mode, outgoing rays 2703 are somewhat angled by MLA 102, which forms a partially focused image on sensor 203, but they are not fully focused so as to create a full light field image.

Figure 30:
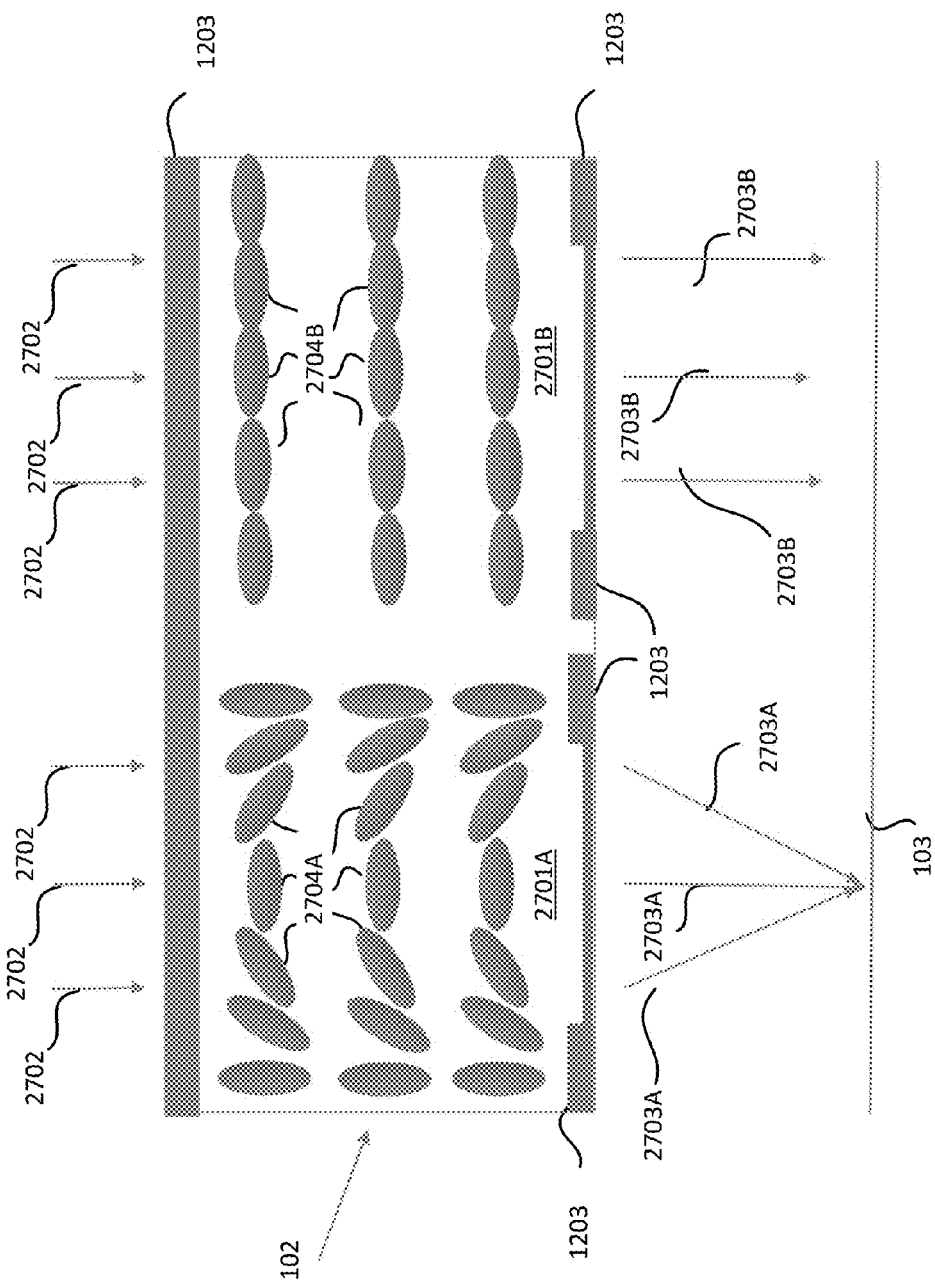
FIG. 30 depicts an example of an optical layout for two liquid crystal microlenses of an image capture apparatus, showing configurations for two different image capture modes, according to one embodiment.

In at least one embodiment, different microlenses 2701 within MLA 102 can be configured differently. In at least one embodiment, such an arrangement can be used to attain intermediate image capture states; the more microlenses 2701 are active, the closer the device is to the light-field image capture state. Referring now to FIG. 30, there is shown an example of an optical layout for two liquid crystal microlenses 2701A, 2701B within an MLA 102 of an image capture apparatus, wherein microlens 2701A is in an active state and microlens 2701B is disabled. Liquid crystal elements 2704A of microlens 2701A are arranged so that microlens 2701A is active, while liquid crystal elements 2704B of microlens 2701 B are arranged so that microlens 2701B is disabled. Again, this can be done, for example, by providing liquid crystal that has optical properties dependent on the orientation of the liquid crystal molecules, and by providing electrodes 1203 to selectively change the state of liquid crystal elements 2704 to attain active mode.

Also depicted in FIG. 30 are incoming rays 2702 and outgoing rays 2703A, 2703B. As can be seen, outgoing rays 2703A are focused by microlens 2701A onto specific sensor locations on sensor 203, while outgoing rays 2703B continue on their parallel path toward sensor 203, indicating that microlens 2701B is optically transparent.

Many of the above-described techniques can be used for implementing intermediate capture modes. For example, in an embodiment in which a microlens array is defined in liquid crystal, as described above in connection with FIGS. 15 and 16, an intermediate voltage level can be applied to the ITO coated glass cell, so that the liquid crystal is aligned in a state between the patterned arrangement of FIG. 15 and the parallel orientation of FIG. 16. Alternatively, others of the above-described techniques can be used for implementing intermediate capture modes: for example, in the arrangement described above in connection with FIGS. 17 and 18, an intermediate electric field can be applied to attain a state between the two modes described above. As another example, in the arrangement described above in connection with FIGS. 10 and 11, different types of fluid can be introduced with intermediate indices of refraction. As yet another example, in the arrangement described above in connection with FIGS. 24 to 26, MLA 102 can be moved closer to or farther from image sensor 103. Accordingly, one skilled in the art will recognize that the particular mechanisms used to attain the various modes, including intermediate modes, as described and depicted above are merely exemplary. Other techniques can be used to provide similar results.

The above description and referenced drawings set forth particular details with respect to possible embodiments. Those of skill in the art will appreciate that other embodiments are possible. First, the particular naming of the components, capitalization of terms, the attributes, data structures, or any other programming or structural aspect is not mandatory or significant, and the mechanisms described herein may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrases "in one embodiment" or "in at least one embodiment" in various places in the specification are not necessarily all referring to the same embodiment.

Some embodiments may include a system or a method for performing the above-described techniques, either singly or in any combination. Other embodiments may include a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions can be embodied in software, firmware and/or hardware, and when embodied in software, can be downloaded to reside on and be operated from different platforms used by a variety of operating systems.

Some embodiments relate to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the system and method set forth herein are not described with reference to any particular programming language. It will be appreciated that a variety of programming languages may be used to implement the teachings described herein, and any references above to specific languages are provided for illustrative purposes only.

Accordingly, various embodiments may include software, hardware, and/or other elements for controlling a computer system, computing device, or other electronic device, or any combination or plurality thereof. Such an electronic device can include, for example, a processor, an input device (such as a keyboard, mouse, touchpad, track pad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or non-portable. Examples of electronic devices that may be used include: a mobile phone, personal digital assistant, smartphone, kiosk, server computer, enterprise computing device, desktop computer, laptop computer, tablet computer, consumer electronic device, or the like. An electronic device for implementing the system or method described herein may use any operating system such as, for example and without limitation: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

While a limited number of embodiments has been described herein, those skilled in the art, having benefit of the above description, will appreciate that other embodiments may be devised which do not depart from the scope of the claims. In addition, it should be noted that the language used in the specification has been principally selected for readability and instructional purposes, and may not have been selected to delineate or circumscribe the inventive subject matter. Accordingly, this disclosure is intended to be illustrative, but not limiting.

What is claimed is:

1. An image capture device having at least three imaging modes, comprising:
   an image sensor, configured to capture image data;
   a main lens, configured to direct incoming light toward the image sensor, along an optical path;
   a microlens array, positioned within the optical path between the main lens and image sensor, the microlens array having at least three states comprising:
     a fully enabled state;
     at least one partially enabled state; and
     a disabled state;
   a mode change mechanism, configured to change the imaging mode of the image capture device by performing at least one of:
     selectively causing the microlens array to be fully enabled;
     selectively causing the microlens array to be partially enabled; and
     selectively causing the microlens array to be disabled.

2. The device of claim 1, further comprising a secondary optical element positioned within the optical path.

3. The device of claim 1, wherein the microlens array has a continuous range of states between the fully enabled state and the disabled state, and wherein the mode change mechanism is configured to selectively cause the microlens array to change to a state within the continuous range of states.

4. The device of claim 3, wherein the mode change mechanism is configured to selectively cause the microlens array to change from a first state to a second state in a continuous manner.

5. The device of claim 1, wherein the image capture device is configured to operate in a 2D imaging mode wherein the image sensor captures 2D image data, a light field capture mode wherein the image sensor captures a first quantity of light field data, and an intermediate mode wherein the image sensor captures a second quantity of light field data;
   wherein the second quantity is smaller than the first quantity;
   and wherein causing the microlens array to be fully enabled causes the device to operate in the light field capture mode;
   and wherein causing the microlens array to be partially enabled causes the device to operate in the intermediate mode;
   and wherein causing the microlens array to be disabled causes the device to operate in the 2D imaging mode.

6. The device of claim 1, wherein the image capture device is configured to operate in a 2D imaging mode wherein the image sensor captures 2D image data, a light field capture mode wherein the image sensor captures light field data at a first level of granularity, and an intermediate mode wherein the image sensor captures light field data at a second level of granularity;
   wherein the first level of granularity is finer than the second level of granularity;
   and wherein causing the microlens array to be fully enabled causes the device to operate in the light field capture mode;

and wherein causing the microlens array to be partially enabled causes the device to operate in the intermediate mode;

and wherein causing the microlens array to be disabled causes the device to operate in the 2D imaging mode.

7. The device of claim 1, further comprising an input device configured to receive user input, and wherein the mode change mechanism is configured to change the imaging mode of the image capture device in response to received user input.

8. The device of claim 1, further comprising a scene analysis module configured to analyze a scene represented by captured image data, and wherein the mode change mechanism is configured to automatically change the imaging mode of the image capture device in response to results of the scene analysis.

9. The device of claim 1, wherein the mode change mechanism is configured to:
   selectively cause the microlens array to be fully enabled by causing the microlens array to become fully optically effective; and
   selectively cause the microlens array to be partially enabled by causing the microlens array to become partially optically effective; and
   selectively cause the microlens array to be disabled by causing the microlens array to become optically transparent while the microlens array remains within the optical path.

10. The device of claim 9, wherein the mode change mechanism comprises an actuator configured to:
    selectively cause the microlens array to be fully enabled by moving the microlens array to a position sufficiently far from the image sensor to cause the microlens array to become fully optically effective;
    selectively cause the microlens array to be partially enabled by moving the microlens array to a position with respect to the image sensor to cause the microlens array to become partially optically effective; and
    selectively cause the microlens array to be disabled by moving the microlens array to a position sufficiently close to the image sensor to cause the microlens array to become optically transparent.

11. The device of claim 10, wherein the actuator comprises at least one selected from the group consisting of:
    a voice coil motor actuator; and
    a microelectromechanical systems actuator.

12. The device of claim 9, further comprising an image processing module configured to, when the microlens array is optically transparent, remove perturbations from the captured image data by applying an inverse of a modulation image.

13. The device of claim 9, further comprising a cavity adjacent to the microlens array, the cavity comprising a medium having changeable refractive index properties, and wherein the mode change mechanism is configured to change the refractive index properties of the medium.

14. The device of claim 13, wherein the medium comprises liquid crystal, and wherein the mode change mechanism comprises:
    electrodes disposed on the microlens array and on a wall of the cavity, configured to change the refractive index properties of the medium in response to application of an electric field between the electrodes.

15. The device of claim 9, wherein the microlens array comprises:
    liquid crystal; and
    at least two electrodes formed from:
        a uniform alignment layer; and
        a patterned alignment layer defining orientation and pre-tilt angle of the liquid crystal to define microlenses;
    and wherein:
        the mode change mechanism is configured to selectively causing the microlens array to be fully enabled or disabled by selectively applying an electric field between the electrodes; and
        the mode change mechanism is configured to selectively causing the microlens array to be partially enabled by selectively applying an intermediate-level electric field between the electrodes.

16. The device of claim 9, wherein the microlens array is constructed from electro-optic material having a changeable refractive index;
    and wherein:
        the mode change mechanism is configured to selectively fully enable or disable the microlens array by selectively applying an electric field to the electro-optic material; and
        the mode change mechanism is configured to selectively partially enable the microlens array by selectively applying an intermediate-level electric field to the electro-optic material.

17. The device of claim 1, wherein the microlens array is constructed from a deformable material.

18. A method for switching between at least three imaging modes in an image capture device comprising an image sensor, a main lens, and a microlens array positioned within an optical path between the main lens and image sensor, the method comprising:
    in response to a command to fully enable the microlens array, activating a mode change mechanism to fully enable the microlens array;
    in response to a command to partially enable the microlens array, activating a mode change mechanism to partially enable the microlens array;
    in response to a command to disable the microlens array, activating the mode change mechanism to disable the microlens array;
    at the image sensor, capturing image data; and
    storing the captured image data.

19. The method of claim 18, wherein the image capture device is configured to operate in a 2D imaging mode wherein the image sensor captures 2D image data, a light field capture mode wherein the image sensor captures a first quantity of light field data, and an intermediate mode wherein the image sensor captures a second quantity of light field data;
    wherein the second quantity is smaller than the first quantity;
    and wherein causing the microlens array to be fully enabled causes the device to operate in the light field capture mode;
    and wherein causing the microlens array to be partially enabled causes the device to operate in the intermediate mode;
    and wherein causing the microlens array to be disabled causes the device to operate in the 2D imaging mode.

20. The method of claim 18, wherein the image capture device is configured to operate in a 2D imaging mode wherein the image sensor captures 2D image data, a light field capture mode wherein the image sensor captures light field data at a first level of granularity, and an intermediate mode wherein the image sensor captures light field data at a second level of granularity;

wherein the first level of granularity is finer than the second level of granularity;

and wherein causing the microlens array to be fully enabled causes the device to operate in the light field capture mode;

and wherein causing the microlens array to be partially enabled causes the device to operate in the intermediate mode;

and wherein causing the microlens array to be disabled causes the device to operate in the 2D imaging mode.

21. The method of claim 20, wherein:

the step of causing the microlens array to be fully enabled is performed in response to received user input to switch to the light field capture mode;

the step of causing the microlens array to be partially enabled is performed in response to received user input to switch to the intermediate mode; and the step of causing the microlens array to be disabled is performed in response to received user input to switch to the 2D imaging mode.

22. The method of claim 18, further comprising:

analyzing a scene represented by captured image data; and wherein:

the step of causing the microlens array to be fully enabled is performed automatically in response to results of the scene analysis;

the step of causing the microlens array to be partially enabled is performed automatically in response to results of the scene analysis; and the step of causing the microlens array to be disabled is performed automatically in response to results of the scene analysis.

23. The method of claim 18, wherein:

causing the microlens array to be fully enabled comprises causing the microlens array to become fully optically effective;

causing the microlens array to be partially enabled comprises causing the microlens array to become partially optically effective; and causing the microlens array to be disabled comprises causing the microlens array to become optically transparent while the microlens array remains within the optical path.

24. The method of claim 23, wherein:

causing the microlens array to be fully enabled comprises moving the microlens array to a position sufficiently far from the image sensor to cause the microlens array to become fully optically effective;

causing the microlens array to be partially enabled comprises moving the microlens array to a position with respect to the image sensor to cause the microlens array to become partially optically effective; and causing the microlens array to be disabled comprises moving the microlens array to a position sufficiently close to the image sensor to cause the microlens array to become optically transparent.

25. The method of claim 23, wherein the device further comprises a cavity adjacent to the microlens array, the cavity comprising a medium having changeable refractive index properties, and wherein:

causing the microlens array to be fully enabled comprises changing the refractive index properties of the medium; and causing the microlens array to be partially enabled comprises changing the refractive index properties of the medium; and causing the microlens array to be disabled comprises changing the refractive index properties of the medium.

26. The method of claim 25, wherein the medium comprises liquid crystal, and wherein changing the refractive index properties of the medium comprises applying an electric field between two electrodes disposed on the microlens array and on a wall of the cavity.

27. The method of claim 23, wherein the microlens array comprises:

liquid crystal; and at least two electrodes formed from:
a uniform alignment layer; and
a patterned alignment layer defining orientation and pre-tilt angle of the liquid crystal to define microlenses;

and wherein:

causing the microlens array to be fully enabled or disabled comprises selectively applying an electric field between the electrodes; and causing the microlens array to be partially enabled comprises applying an intermediate-level electric field between the electrodes.

28. The method of claim 23, wherein the microlens array is constructed from electro-optic material having a changeable refractive index;

and wherein:

causing the microlens array to be fully enabled or disabled comprises selectively applying an electric field to the electro-optic material; and causing the microlens array to be partially enabled comprises applying an intermediate-level electric field to the electro-optic material.

* * * * *